United States Patent
Kawai et al.

(10) Patent No.: US 11,302,151 B2
(45) Date of Patent: Apr. 12, 2022

(54) GAME APPARATUS AND RECORDING MEDIUM

(71) Applicant: KONAMI AMUSEMENT CO., LTD., Ichinomiya (JP)

(72) Inventors: Norifumi Kawai, Ichinomiya (JP); Takayuki Hosokawa, Ichinomiya (JP)

(73) Assignee: KONAMI AMUSEMENT CO., LTD., Ichinomiya (JP)

( * ) Notice: Subject to any disclaimer, the term of this patent is extended or adjusted under 35 U.S.C. 154(b) by 0 days.

(21) Appl. No.: 16/798,742

(22) Filed: Feb. 24, 2020

(65) Prior Publication Data

US 2020/0193766 A1 Jun. 18, 2020

Related U.S. Application Data

(63) Continuation of application No. PCT/JP2018/032157, filed on Aug. 30, 2018.

(30) Foreign Application Priority Data

Aug. 31, 2017 (JP) .............................. JP2017-167835

(51) Int. Cl.
*G07F 17/32* (2006.01)

(52) U.S. Cl.
CPC ........ *G07F 17/329* (2013.01); *G07F 17/3258* (2013.01); *G07F 17/3267* (2013.01)

(58) Field of Classification Search
CPC ... G07F 17/326; G07F 17/3267; G07F 17/329
See application file for complete search history.

(56) References Cited

U.S. PATENT DOCUMENTS

| 2005/0075157 A1* | 4/2005 | Seelig ................. G07F 17/3211 463/16 |
| 2005/0159211 A1* | 7/2005 | Englman ............. G07F 17/3267 463/25 |

(Continued)

FOREIGN PATENT DOCUMENTS

| JP | 2007-125050 A | 5/2007 |
| JP | 2010-110525 A | 5/2010 |

(Continued)

OTHER PUBLICATIONS

Communication dated Nov. 6, 2020, from the Taiwanese Patent Office in Application No. 107130351.

(Continued)

*Primary Examiner* — David L Lewis
*Assistant Examiner* — Robert E Mosser
(74) *Attorney, Agent, or Firm* — Sughrue Mion, PLLC

(57) ABSTRACT

A game apparatus includes at least one processor, and a memory that is coupled to the at least one processor and configured to store therein instructions executed by the at least one processor. In the game apparatus, based on the instructions, the at least one processor is configured to select, by lottery, at least one lottery element from among lottery elements including a specific lottery element in an event, award a player a reward when the specific lottery element is selected, and change, based on a result of the lottery in the event, a probability of selecting the specific lottery element in a next event.

16 Claims, 17 Drawing Sheets

(56) References Cited

U.S. PATENT DOCUMENTS

2010/0210342 A1* 8/2010 Pollack .............. G07F 17/3244
463/20
2016/0078711 A1* 3/2016 Rucker .................. G07F 17/34
463/21

FOREIGN PATENT DOCUMENTS

| JP | 2014-200600 A | 10/2014 |
|----|---------------|---------|
| JP | 2016-67949 A | 5/2016 |
| JP | 2017-29827 A | 2/2017 |
| JP | 2017-104492 A | 6/2017 |
| TW | 362031 B | 6/1999 |
| TW | 200744722 A | 12/2007 |

OTHER PUBLICATIONS

Communication dated Jul. 14, 2020, from the Taiwanese Patent Office in Application No. 107130351.
International Search Report dated Oct. 9, 2018, in International Application No. PCT/JP2018/032157.
Written Opinion of the International Searching Authority dated Oct. 9, 2018, in International Application No. PCT/JP2018/032157.
Communication dated Jan. 9, 2018, from the Japanese Patent Office in application No. 2017-167835.
Communication dated May 29, 2018, from the Japanese Patent Office in application No. 2017-167835.
Communication dated Oct. 9, 2018 from the Japanese Patent Office in application No. 2017-167835.
Communication dated Mar. 12, 2019 from the Japanese Patent Office in application No. 2017-167835.
Communication dated Mar. 9, 2020 from the Taiwanese Intellectual Patent Office in application No. 170130351.
REKKA Co., Ltd, "CAPCOM Perfect Capture Series 62, SENGOKU BASARA2 Hero Supplementary Biography HEROES Double Pack Full Capture Guidebook," CAPCOM Co., Ltd., Dec. 30, 2007, 1st edition, p. 332,( 4 pages total).
Communication dated Apr. 19, 2021 by the Taiwanese Patent Office in application No. 107130351.
Notice of Reasons for Refusal dated Aug. 10, 2021 from the Japanese Patent Office in JP Application No. 2019-114540.
Office Action dated Aug. 11, 2021 from the Taiwanese Intellectual Property Office in TW Application No. 107130351.

* cited by examiner

< PUSHER GAME >

< NORMAL SLOT GAME >

< VARIABLE PROBABILITY SLOT GAME >

< PAYOUT OF LARGE BALLS >

< TRANSITION TO MARBLE JP CHANCE >

< CELL MANAGEMENT TABLE >

| CELL TYPE | CENTRAL ANGLE (Degree) | ATTRIBUTE |
|---|---|---|
| RED CELL | 30 | — |
| NORMAL CELL (1) | 50 | CREDIT REWARD |
| NORMAL CELL (2) | 50 | ADDITION OF LOTTERY BALLS |
| NORMAL CELL (3) | 50 | CREDIT REWARD |
| BLUE CELL | 30 | — |
| NORMAL CELL (4) | 50 | ADDITION OF LOTTERY BALLS |
| NORMAL CELL (5) | 50 | CREDIT REWARD |
| NORMAL CELL (6) | 50 | ADDITION OF LOTTERY BALLS |

< CELL MANAGEMENT TABLE >

| CELL TYPE | CENTRAL ANGLE (Degree) | ATTRIBUTE |
|---|---|---|
| RED CELL | 50 | ——— |
| NORMAL CELL (1) | 43.3 | CREDIT REWARD |
| NORMAL CELL (2) | 43.3 | ADDITION OF LOTTERY BALLS |
| NORMAL CELL (3) | 43.3 | CREDIT REWARD |
| BLUE CELL | 40 | ——— |
| NORMAL CELL (4) | 46.7 | ADDITION OF LOTTERY BALLS |
| NORMAL CELL (5) | 46.7 | CREDIT REWARD |
| NORMAL CELL (6) | 46.7 | ADDITION OF LOTTERY BALLS |

GAME APPARATUS AND RECORDING MEDIUM

CROSS REFERENCE TO RELATED APPLICATIONS

This Application is a Continuation Application of PCT Application No. PCT/JP2018/032157, filed Aug. 30, 2018, which is based on and claims priority from Japanese Patent Application No. 2017-167835, filed Aug. 31, 2017, the entire contents of which are incorporated herein by reference.

BACKGROUND

Field of the Invention

The present invention relates to game apparatuses and programs.

Description of Related Art

For example, Japanese Patent Application Laid-Open Publication No. 2010-110525 recites a game apparatus in which a player acquires a reward based on a result of selecting, by lottery, any of a number of lottery elements. In such a game apparatus, various lottery games are provided. A player can play a lottery game according to a result or a procedure of a main game, and when a predetermined condition is satisfied, a predetermined reward is awarded to the player.

In the game apparatus described above, a lottery probability and a reward of each lottery game are set, and a player plays a lottery game corresponding to the result or the procedure of the main game. Generally, in a lottery game in which many rewards can be acquired, such as a jackpot, a player cannot simply play such a game anytime but can play only after completing one or more lottery games provided in the previous stage(s) of the main game. In other words, if a player fails to complete the one or more lottery games in the previous stage(s), the player cannot play a following lottery game by which many rewards can be acquired. Therefore, if a player tries, but fails, to win a middle-stage lottery game(s) several times, the player may stop continuing to play the main game itself before playing a lottery game by which many rewards can be acquired.

SUMMARY

The present invention has been achieved in view of the above circumstances, and an object of the present invention is to provide a technique or the like that can motivate a player to continue playing a game.

In order to achieve the above object, a game apparatus according to an aspect of the present invention includes: at least one processor, and a memory that is coupled to the at least one processor and configured to store therein instructions executed by the at least one processor, in which based on the instructions, the at least one processor is configured to: select, by lottery, at least one lottery element from among lottery elements including a specific lottery element, in an event; award a player a reward when the specific lottery element is selected; and change, based on a result of the lottery in the event, a probability of selecting the specific lottery element in a next event.

DESCRIPTION OF THE EMBODIMENTS

Figure 1:
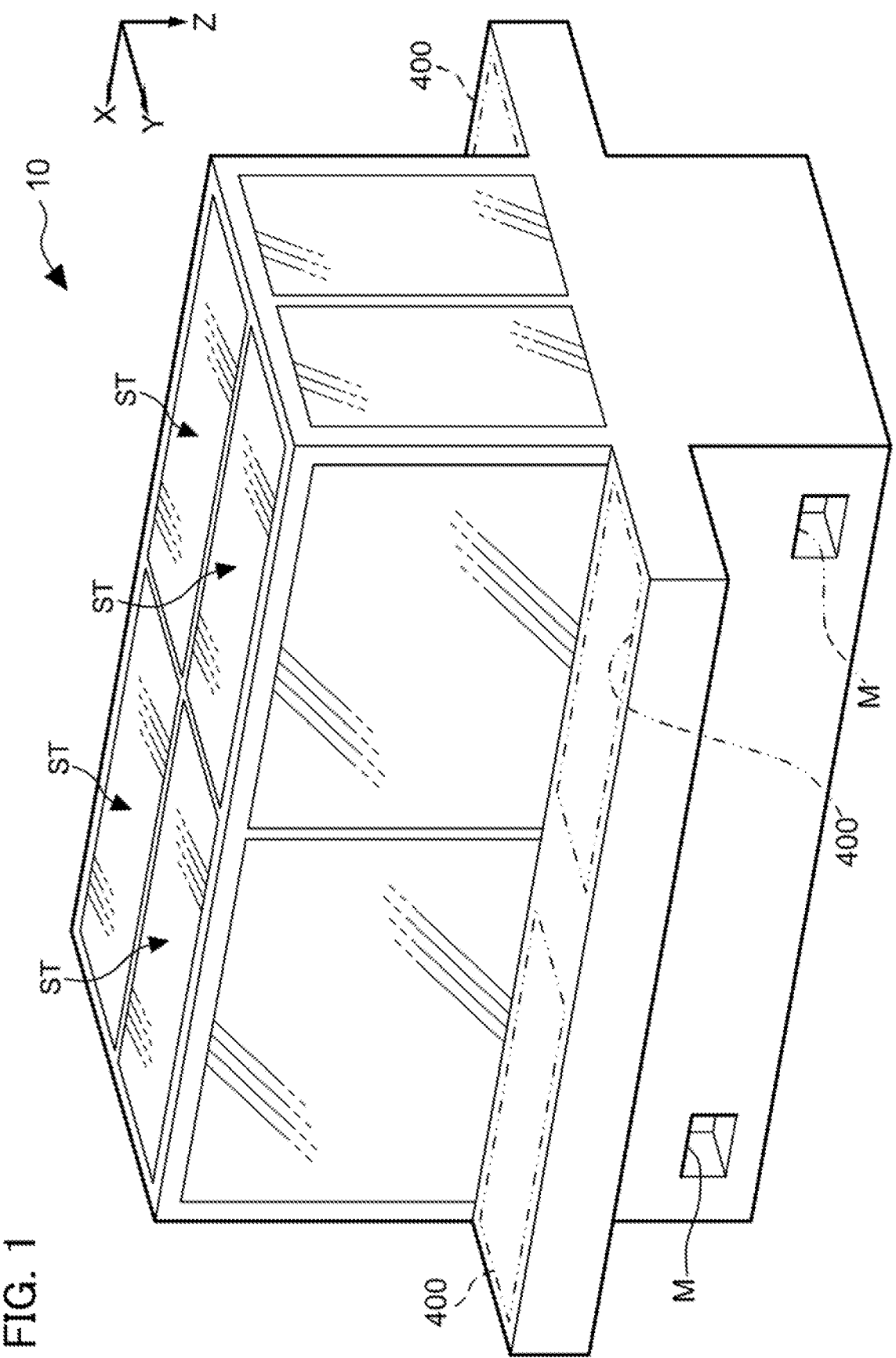
FIG. 1 is a diagram illustrating a game apparatus according to an embodiment.

Embodiments of the present invention will be explained below with reference to the drawings. The dimensions and the scales of parts in the drawings may be different from the dimensions and the scales of actual configurations, as appropriate. The embodiments described below are preferred specific examples of the present invention, and various technically preferable limitations are included in the embodiments. The scope of the present invention is not limited to the embodiments exemplified below unless otherwise described to specifically limit the present invention.

Summary of Game Apparatus

Figure 2:
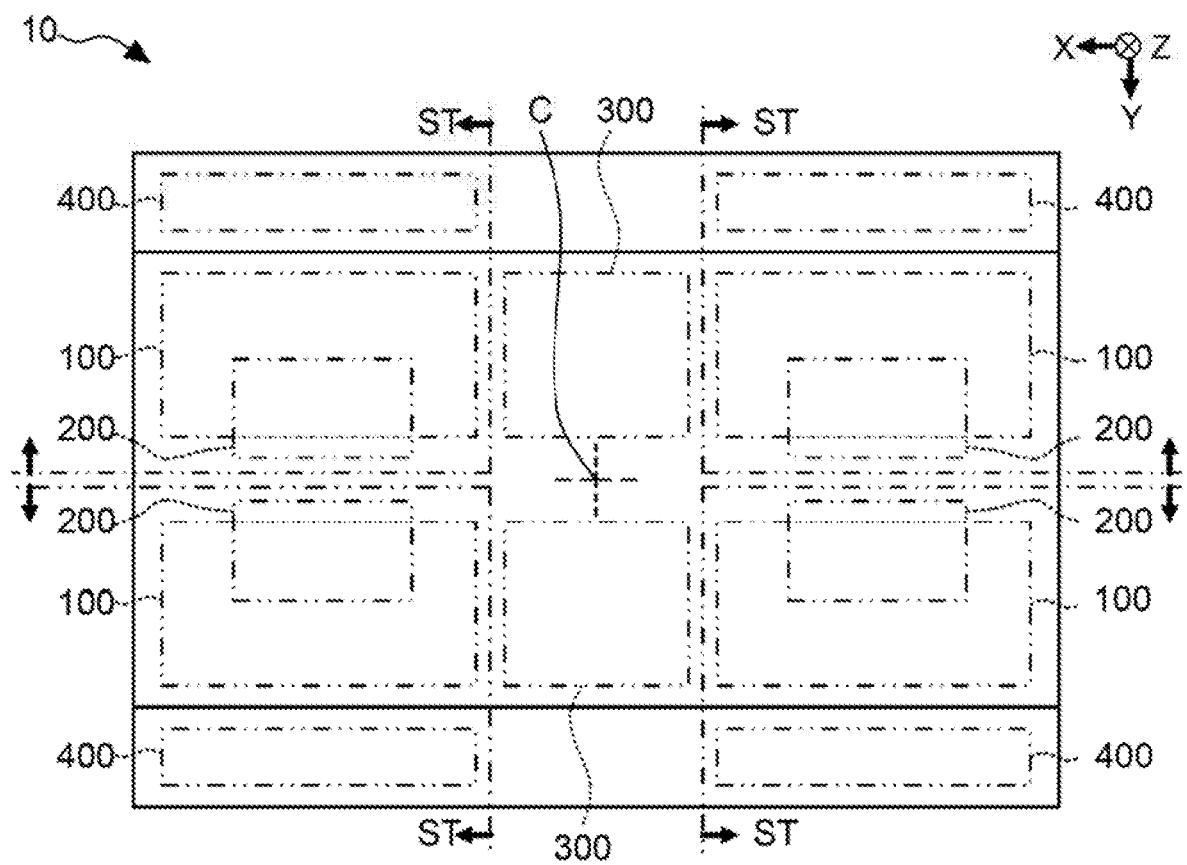
FIG. 2 is a plan view illustrating an example of arrangement of station units in the game apparatus.

FIG. 1 is diagram illustrating a game apparatus according to an embodiment. FIG. 2 is a diagram illustrating an example of arrangement of each portion when the game apparatus is seen in planar view. A game apparatus 10 is installed in, for example, entertainment facilities, such as a video arcade, or a casino, or commercial facilities, such as a shopping mall. The game apparatus 10 may also be referred to as a "gaming machine" when used in a casino.

The game apparatus 10 is provided with station units ST. In the game apparatus 10 shown in FIG. 1 and FIG. 2, four station units ST are provided, and as seen in planar view, these station units ST are arranged substantially at symmetrical positions based on a center C in FIG. 2. In each of the station units ST, it is assumed that one player plays a game. Each station unit ST includes a pusher game field 100, an area 200 positioned above the field (on a negative side in a Z direction), and a control panel 400. Among these elements, a mechanism for providing a pusher game (a table moving game) is provided in the pusher game field 100, and a mechanism for providing a marble chance is provided in the area 200. A mechanism, such as a button for a player to operate, is provided in the control panel 400. A mechanism for providing a marble JP (jackpot) chance is provided in FIG. 2, in an area 300 between two station units ST adjacent to each other in an X direction in FIG. 2.

It is to be noted that the game apparatus 10 is not necessarily an arcade-use device installed in stores as shown in FIG. 1, and may be realized as, for example, a household-use or an information terminal device, such as a mobile terminal device that displays a screen simulating the station unit ST.

A player can play a game on the game apparatus 10 by spending something that has value in play of the game, which is referred to as a game value (value media). Examples of a game value include a token coin (a medal), a coin (money), a ticket, a credit and a point and the like. Token coins, coins, tickets and the like are referred to as tangible value mediums. Credits, points and the like are referred to as intangible value mediums. The game value may also be called a game token or substitute money. A player can play a game on the game apparatus 10 on the condition of spending game values. It is to be noted that a player may select and spend either a tangible game value, such as a token coin, or an intangible game value, such as a credit.

Game values are awarded to a player as a reward according to the result of playing a game using the game apparatus 10. Game values spent to play a game and game values awarded to a player as a reward may be either of the same type or of different types. For example, a case is assumed in which play of a game is started with the insertion of a predetermined number of token coins. In this case, the game apparatus 10 may award a player a number of token coins (of the same type of game values) according to result of the play. Alternatively, the game apparatus 10 may award the player a number of tickets (of a different type of game values) according to the result of the play. It is to be noted that spending of game values may also be called to inputting game values, and award of game values may also be called payment of game values.

When intangible game values, such as credits, are awarded to a player as a reward, the reward may be converted to tangible game values, such as token coins, and be paid out to the player by triggering a predetermined operation, for example. The intangible game values, such as credits, are electrically managed by a management device in a state in which the intangible game values are associated with identification information of the player. The management device is, for example, a computer installed at entertainment facilities or commercial facilities. The player spends some or all of intangible game values managed by the management device in a game or can deposit intangible game values awarded as a reward into the management device.

A fixed value is set to a game value. However, the value of a game value may be set as a variable value by storing the quantity of game values or identification information that represents the quantity in a storage circuit (for example, an IC tag). Alternatively, the value may be set as a variable value by printing a code (for example, a barcode or a QR code (registered trademark)) that represents the quantity of game values on the game values. Game values awarded to a player may be exchanged for various goods, such as a prize. In the first embodiment, a case is assumed in which game values spent for a game and game values awarded to a player as a reward according to the result of a play are token coins.

A game in which game objects are used is executed in the game apparatus 10. Game objects are used for a game, for example, by spending of game values. For example, game objects according to spending of the game values are input to a game field. Spent tangible game values may be used directly as the game objects for a game. Alternatively, game objects different from the spent tangible game values may be used for a game. For example, token coins inserted by a player may be used directly as the game objects for a game. Alternatively, balls that are different from the token coins inserted by a player may be used as the game objects for a game. If the game apparatus 10 is configured such that a different type of game objects from spent game values are used for a game, the relationships between the amount of the spent game values and the quantity of the game objects used for a game by the spending may be appropriately changed. For example, two game objects may be fed in exchange for spending one token coin. Alternatively, one game object may be fed in exchange for spending one token coin. When a player plays a game by spending intangible game values, such as credits, game objects are fed into a game field by an operation of a given operator (not shown), such as a button, by the player, for example.

Control Panel

Figure 3:
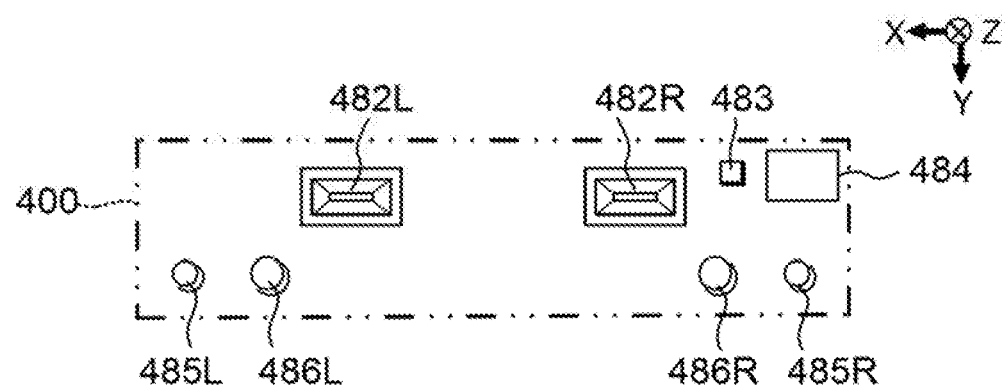
FIG. 3 is a diagram illustrating an example of a control panel in the station unit.

FIG. 3 is a diagram illustrating an example of a control panel 400 in one station unit ST. As shown in FIG. 3, the control panel 400 is provided with slots 482L and 482R, a payout button 483, a reader 484, direction change buttons 485L and 485R, and feeding buttons 486L and 486R.

Tangible game values, such as token coins, are input to the slots 482L and 482R. The reader 484 is a non-contact type device that performs reading and writing of various pieces of information from and to an arranged card, for example. The card stores thereon information relating to a player and information relating to the quantity of intangible game values, such as credits. There may be provided a server device (not shown) connected to the game apparatus via a network. In this case, the server device may store thereon the quantity of game values held by a player in association with the information relating to the player (for example, player identification information or card identification information). A player can play a game provided by the station unit ST by arranging a card in the reader 484 or inserting a predetermined number of token coins or the like into either the slot 482L or 482R to spend a predetermined amount of game values. The credits only need to be a currency that can be used in a game, and can be exchangeable or not exchangeable for real money. For example, when the station unit ST is used as a gaming machine in a casino, the credit corresponds to money (banknotes, coins). Credits may be exchanged for a number of token coins or tickets proportional to the amount of credits. Exchange of credits for money, token coins, tickets, or the like may be performed by either the station unit ST or the game apparatus 10. The game apparatus 10 may be configured such that not only the token coins, but also tickets, money, or the like are inserted to the slots 482L and 482R, and a player plays a game according to the corresponding amount of credits. Details of the direction change buttons 485L and 485R, and the feeding buttons 486L and 486R, will be described later.

Token coins or the like are discharged to a payout port M by an operation of the payout button 483 by a player. Credits corresponding to the token coins or the like may be written to a card arranged in the reader 484 instead of the payout of token coins or the like. Alternatively, the credits may be stored in a storage of the server device connected to the game apparatus 10 via the network. The game apparatus 10 may be configured such that a player can select either payout of token coins or the like, or addition of credits to a card. The game apparatus 10 is described as having a configuration in which a game is provided to a player by spending of a predetermined amount of credits and a reward is awarded to the player by adding the amount of credits (credit mode). However, the game apparatus 10 may be configured such that a game is provided when a predetermined number of token coins or the like are inserted to the slots 482L and 482R, and token coins or the like are paid out from the payout port M as a reward (token mode). It is preferable to display whether the mode is the credit mode or the token mode so that a player can understand the mode.

Summary of Game

Games provided to players will be described next.

Transition of Games

Figure 4:
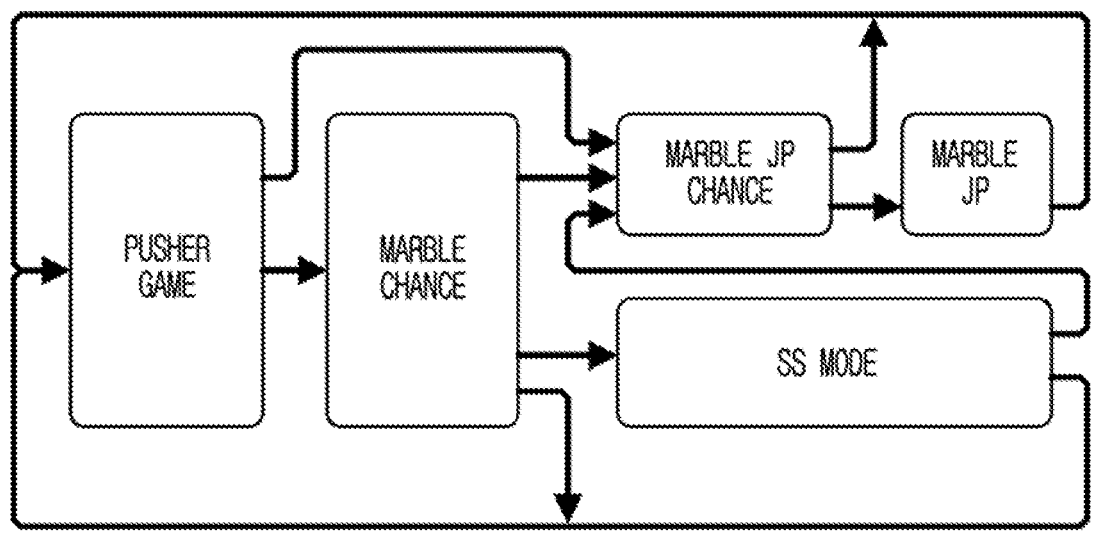
FIG. 4 is a diagram illustrating an example of transition of a game state.

FIG. 4 is a diagram illustrating an example of transition of a game state provided to a player in the station unit ST, the area 300, and the like. As shown in FIG. 4, the game state is divided into "pusher game", "marble chance", "marble JP chance", "marble JP", and "SS mode", and the game state transitions in a direction indicated by arrows in FIG. 4.

The "pusher game" is a game using game objects including small balls and large balls, and it is provided in the pusher game field 100. In the "pusher game", when a small ball falls into a winning port, a reward is awarded to a player, and when the number of large balls having fallen into the winning port has reached a predetermined number, the game transitions to the "marble chance". In the "pusher game", when a small ball passes a predetermined checker, a slot game (a lottery slot game) is executed. In the slot game, symbols arranged on a line are sequentially changed, and at a point in time when the change is stopped, if specific symbols are lined up on the line, a win (winning a reward) is established. The slot game includes a normal slot game and a variable probability slot game. In the slot game, when a win is established by a specific symbol, a reward is awarded to a player, and when a win is established by another symbol, a large ball is fed. When a win is established by another specific symbol, the game directly jumps to the "marble JP chance" without passing through the "marble chance".

The "marble chance" is a lottery game using distributers and an accessory (distributer or sorter) that distribute small balls to a plurality of paths, and are provided in the area 200. In the "marble chance", a predetermined number of small balls are entered onto a first distributer. Among these small balls, some balls having passed through a specific hole are fed to a second distributer. Among the small balls entered onto the second distributer, some small balls having passed through a specific hole are entered onto an accessory. In the "marble chance", when the number of small balls having passed through a hole in the accessory at a predetermined timing has reached a predetermined value, the game state transitions to the "marble JP chance" or the "SS mode". When the number of small balls having passed through a hole in the accessory at the predetermined timing has not reached the predetermined value, the game state returns to the "pusher game".

The "marble JP chance" is a lottery game using a half pipe, a game board, and an accessory (different from the accessory in the "marble chance"), and it is provided in the area 300. In the "marble JP chance", of a predetermined number of small balls fed into the half pipe, small balls having passed through a specific hole are fed onto the game board, and of the small balls fed onto the game board, small balls having passed through a specific hole are fed into the accessory. In the "marble JP chance", among the small balls fed into the accessory, when one or more small balls have passed through a specific hole, the game state transitions to the "marble JP"; however, if a small ball has not passed through the specific hole, the game state returns to the "pusher game".

In the "marble JP", a reward is awarded to a player, and small balls stored in a ceiling storage (not shown) are fed to the pusher game field at the same time, and the game state returns to the "pusher game", thereby dramatically increasing the number of small balls falling into the winning port in the pusher game field, and increasing the number of small balls passing through the checker, immediately after the game state returns from the "marble JP" to the "pusher game". Therefore, when transitioning to the "marble JP", as a result, many rewards are awarded to a player also in the "pusher game".

The "SS mode" is a lottery game using the variable probability slot game, a screen display, and falling of small balls, in which a reward is awarded to a player by a predetermined win, and the game state may transition to the "marble JP chance". In the "SS mode", if a win is not established, the game state returns to the "pusher game". The transition of the game state shown in FIG. 4 is merely an example.

Pusher Game

The "pusher game" described above will be described next.

Figure 5:
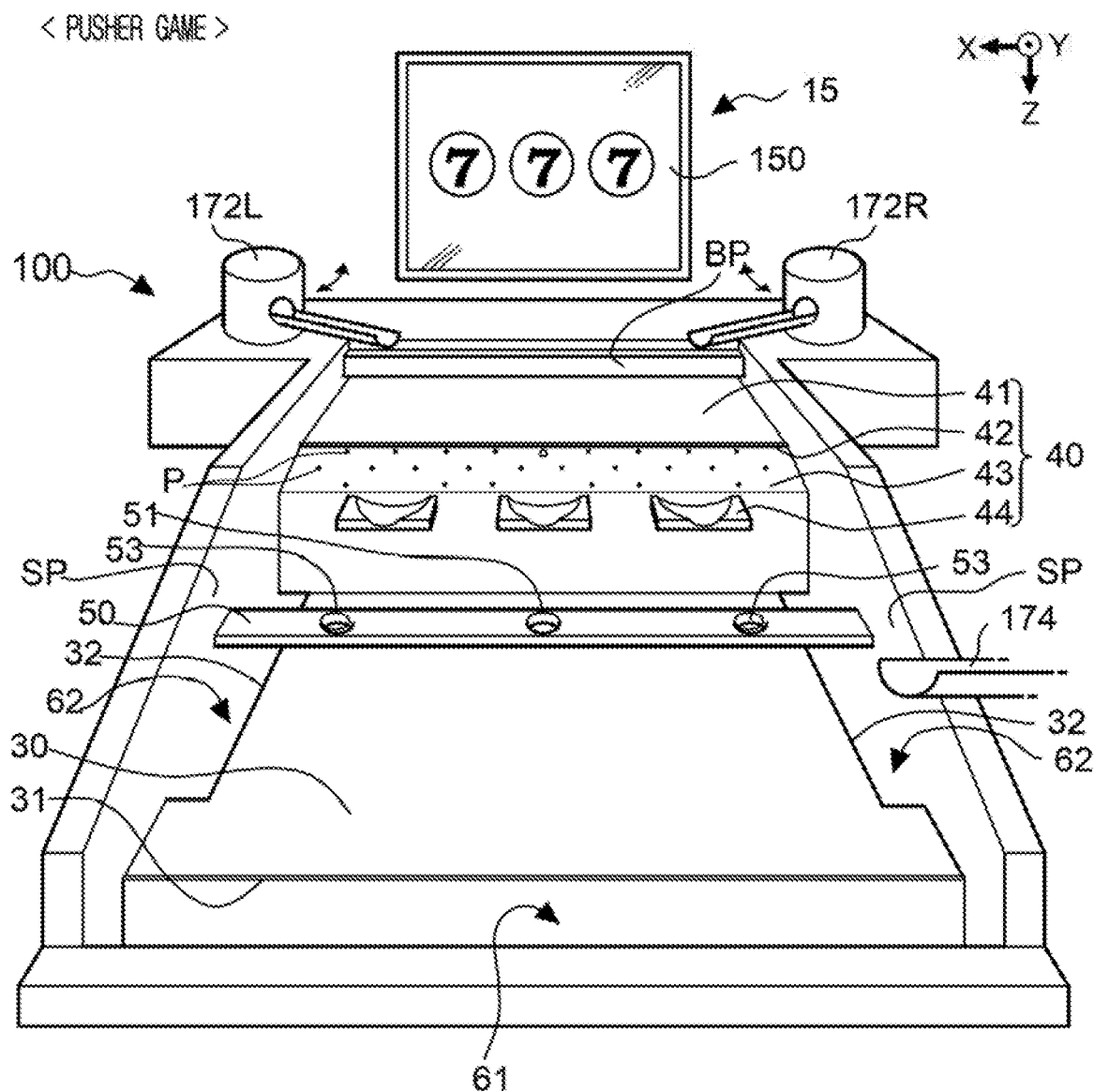
FIG. 5 is a diagram illustrating an example of a pusher game field.
Figure 6:
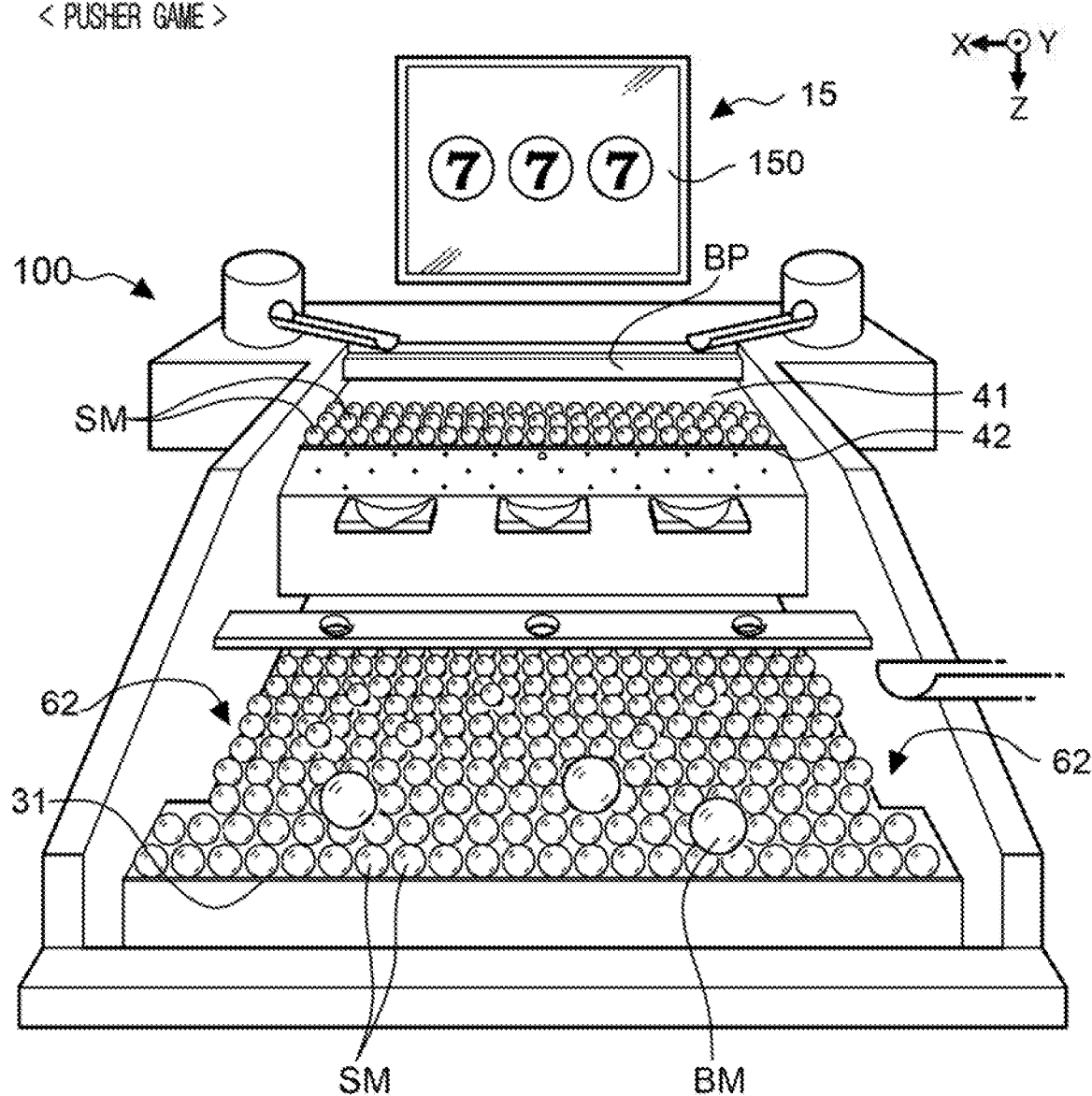
FIG. 6 is a diagram illustrating an example of the pusher game field.

FIG. 5 and FIG. 6 are diagrams each illustrating an example of the pusher game field 100 providing the "pusher game". FIG. 5 illustrates an example in which small balls SM and large balls BM are removed from the pusher game field 100 for explanation. FIG. 6 illustrates an example in which small balls SM and large balls BM are arranged in the pusher game field 100. The pusher game field 100 is a space that provides the "pusher game". A table 30 and a pusher table 40 are arranged in the pusher game field 100.

The small ball SM is an example of the game objects, and it is a rollable object regardless of the orientation thereof. For example, a spherical body and a regular polyhedron are suitable as the small ball SM. In the game apparatus 10, for example, glass marbles having a diameter of about 15 millimeters are used as the small balls SM. One reason for using a glass marble is that the glass marble has excellent wear resistance. Another reason is that a glass marble has high reflectance, thereby enabling it to be easily spotted by a player, for example, when it is irradiated with light, and it is easily detected by a sensor. Furthermore, it suffices for the large ball BM to be a rollable game object that is easily distinguished from the small ball SM by a player and by the apparatus. In the game apparatus 10, a glass marble having, for example, a diameter of about 30 millimeters, is used as the large ball BM.

The pusher table 40 reciprocates in a front-back direction of the drawing along an upper surface of the table 30 between the side plates SP. The table 30 is slightly inclined in a Z direction (gravity direction) toward a Y direction (front side) on the player's side. At a front end of the table 30, an edge 31 is provided along a direction substantially vertical to a moving direction of the pusher table 40, to regulate the movement of small balls SM toward the front side. A front area 61, which is a winning port into which small balls SM and large balls BM can fall, is provided in front of the edge 31. An edge 32 is provided along the moving direction of the pusher table 40 both at a left end and a right end of the table 30, to regulate the movement of small balls SM to the left and the right. There are provided two side areas 62, each of which is a non-winning port into which small balls SM can fall. One of the side areas 62 is positioned at the left end of the table 30, and the other is positioned at the right end of the table 30.

The pusher table 40 includes an upper surface 41, an edge 42, a slope 43, and guide paths 44. The upper surface is sloped so as to decline toward the downstream on the player's side. The edge 42 is provided at a front end of the upper surface 41. The slope 43 is provided on the front side of the edge 42, and it is an inclined surface with a greater inclination than that of the upper surface 41. Each of the guide paths 44 is provided at the front end of the slope 43, and projects from a front surface of the pusher table 40. In the examples shown in FIG. 5 and FIG. 6, there are three guide paths 44. Pins P are provided on the slope 43. The pins P regulate the flow of small balls SM coming over the edge 42 so as not to move in a certain direction by the slope 43. A back plate BP is provided on an upper side of the pusher table 40, and it spans across the right and left side plates SP in a state facing the upper surface 41. This allows the pusher table 40 to enter into a space between the table 30 and the back plate BP when moving to the far side in the reciprocating motion.

A small ball feeder 172L turns in either direction indicated by an arrow in FIG. 5 when a player presses the direction change button 485L (see FIG. 3), and after having turned to an end point of a turnable range, turns to an opposite direction. When the player releases the direction change button 485L, the small ball feeder 172L stops turning. Furthermore, when the player presses the feeding button 486L once, the small ball feeder 172L feeds one small ball SM into the pusher game field 100. Therefore, the player is able to decide the direction of feeding a small ball SM from the left side of the pusher game field 100 by pressing the direction change button 485L, and can feed the small ball SM from the direction by pressing the feeding button 486L. A small ball feeder 172R is substantially the same as the small ball feeder 172L, and it turns in either direction indicated by an arrow when the player presses the direction change button 485R, and after having turned to an end point of a turnable range, turns to an opposite direction. When the player releases the direction change button 485R, the small ball feeder 172R stops turning. Furthermore, when the player presses the feeding button 486R once, the small ball feeder 172R feeds one small ball SM into the pusher game field 100. Therefore, the player can decide the direction of feeding a small ball SM from the right side of the pusher game field 100 by pressing the direction change button 485R, and can feed the small ball SM from the direction by pressing the feeding button 486R.

When one small ball SM is fed by a player who presses the feeding button 486L or 486R once, the number of credits is subtracted from the player, for example, decreased by "1". The small ball SM may be fed from an upstream (far side) via a supply path (not shown) or the like, other than from the small ball feeders 172L and 172R, when a predetermined condition is satisfied.

A side strut 50 in a thin plate shape extending in right and left directions spans across the right and left side plates SP on an upper side of the table 30. The side strut 50 is provided at a higher position than the diameter of the small ball SM with respect to the upper surface of the table 30. The side strut 50 has three checkers: a checker 51 and two checkers 53. Each of the checkers has a hole having a diameter through which a small ball SM can pass. The checker 51 is positioned substantially at the center of the side strut 50 in FIG. 5. One of the two checkers 53 is positioned on the left of the checker 51, and the other one is positioned on the right of the checker 51. Specifically, rear ends of the checkers 51 and 53 are positioned below the front end of the three guide paths 44, when the pusher table 40 moves to the frontmost side. The checker 51 and the checkers 53 detect passage of a small ball SM using a sensor (not shown).

When the pusher table 40 reciprocates, small balls SM placed excessively on the upper surface 41 are pushed out by the back plate BP, pass over the edge 42, and roll on the slope 43. Once the pusher table 40 approaches sufficiently the side strut 50, when small balls SM guided from the slope 43 to the guide paths 44 fall from the guide paths 44, the small balls SM pass through the checker 51 or the checkers 53 and move toward the table 30. There are small balls SM that pass over the edge 42 and roll on the slope 43. Among these small balls SM, some that are not guided to the guide paths 44, or some that are guided to the guide paths 44 but did not pass through the checker 51 or the checkers 53, also move onto the surface of the table 30. For example, small balls SM that have fallen from the guide paths 44 in a state in which the pusher table 40 is sufficiently away from the side strut 50 move onto the surface of the table 30 without passing through the checker 51 or the checkers 53.

Small balls SM having moved to the table 30 are pushed out by the reciprocating motion of the pusher table 40, if an excessive number of small balls SM is placed on the table 30, and move over the edge 31 and fall into the front area 61, or move over the edge 32 and fall into the side areas 62. When the sensor detects a small ball SM having fallen into the front area 61, a reward is awarded to a player. For example, when one small ball SM falls into the front area 61, the number of credits of the player is incremented by "1". The side areas 62 are so-called "fall from side holes (outzone)", and even if a small ball SM falls into the side areas 62, no reward is awarded to a player.

In FIG. 5, although only a part is shown, a large ball feeder 174 feeds one large ball BM to the table 30 on the downstream (front side) than the side strut 50, when a player wins by aligning specific symbols in the normal slot game or the variable probability slot game described later. Then the fed large ball BM falls into the front area 61 as in the small ball SM by the reciprocating motion of the pusher table 40. The large ball BM that has fallen into the front area 61, is counted by the sensor, and when the count reaches a threshold, the game state transitions to the "marble chance".

Each of the side areas 62 is actually covered with a blindfold plate (not shown), and cannot be seen by a player. The large ball BM is regulated by the blindfold plate so as not to fall into the side areas 62. However, the game apparatus 10 may be configured such that large balls BM can fall into the side areas 62.

A display device 15 is provided above the back plate BP on a far side thereof (a negative side in the Y direction). In FIG. 5 and FIG. 6, a part of the configuration is omitted to avoid complexity in the drawings. For example, in FIG. 5 and FIG. 6, illustration is omitted of a part of a screen-front lottery portion using the display device 15 and an accessory.

In the "pusher game", the normal slot game and the variable probability slot game using the display device 15 are executed. Each of the normal slot game and the variable probability slot game executed in the "pusher game" is described next.

Figure 7:
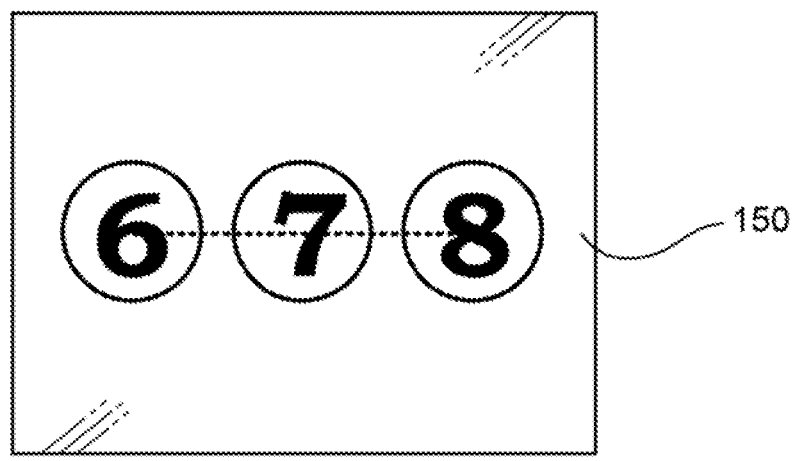
FIG. 7 is a diagram illustrating an example of a screen displayed on a display device.
Figure 8:
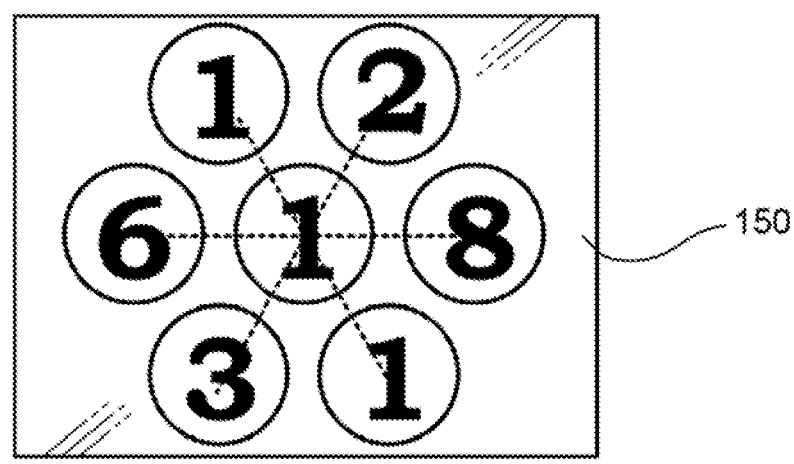
FIG. 8 is a diagram illustrating an example of a screen displayed on the display device.

FIG. 7 is a diagram illustrating an example of the normal slot game. FIG. 8 is a diagram illustrating an example of the variable probability slot game. The normal slot game is a so-called one-line slot game in the example of FIG. 7, and a win is established when the same three symbols are lined up in a lottery. The variable probability slot game is a three-line slot game in which six symbols are arranged diagonally around one symbol in the example of FIG. 8, and when the same three symbols are lined up on at least one line, a win is established. In the present embodiment, symbols to be used in the normal slot game and the variable probability slot game have, for example, a spherical shape. There are 11 types, that is, number symbols from "1" to "9", "BIG marble" (see FIG. 9), and "direct JP" (see FIG. 10). Probability of occurrence is preset for each of these symbols. In the normal slot game, if number symbols "2", "4", "6", or "8" are lined up, a predetermined reward is awarded to a player. In the normal slot game, if number symbols "1", "3", "5", or "9" are lined up, a predetermined reward is awarded to a player, and the game transitions to the variable probability slot game. In the variable probability slot game, if number symbols excluding "7" are lined up, the number of executions of the variable probability slot game is added (incremented) by the number obtained by multiplying the lined up number by a coefficient "5". For example, in the variable probability slot game, when number symbols "9" are lined up, "45" obtained by multiplying the lined up number "9" by the coefficient "5" is added to the number of executions of the variable probability slot game.

Figure 9:
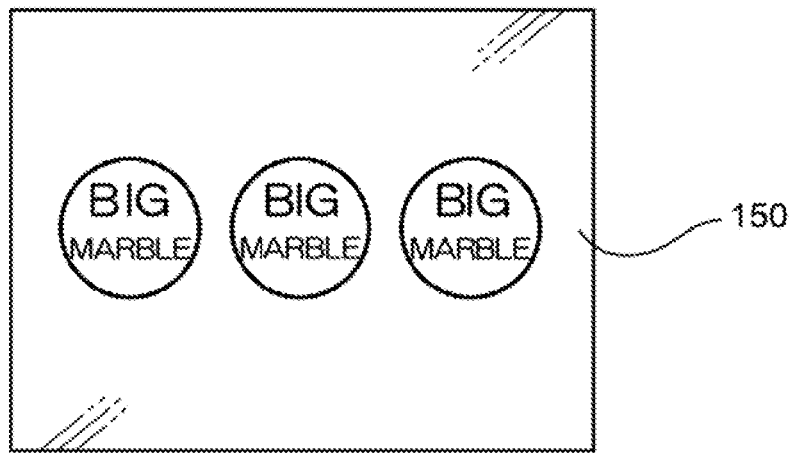
FIG. 9 is a diagram illustrating an example of a screen displayed on the display device.
Figure 10:
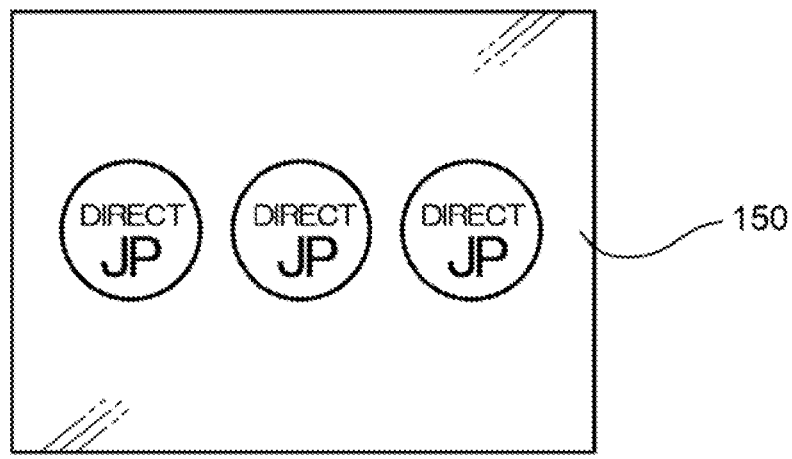
FIG. 10 is a diagram illustrating an example of a screen displayed on the display device.

In a normal slot game or a variable probability slot game, if "BIG marble(s)" are lined up, the large ball feeder 174 feeds one large ball BM to the table 30. FIG. 9 illustrates an example in which three "BIG marble(s)" are lined up in the normal slot game. In the normal slot game or the variable probability slot game, if three "direct JP" or number symbols "7" are lined up, the game state transitions from the "pusher game" to the "marble JP chance". FIG. 10 illustrates an example when three "direct JP" are lined up in the normal slot game.

Figure 11:
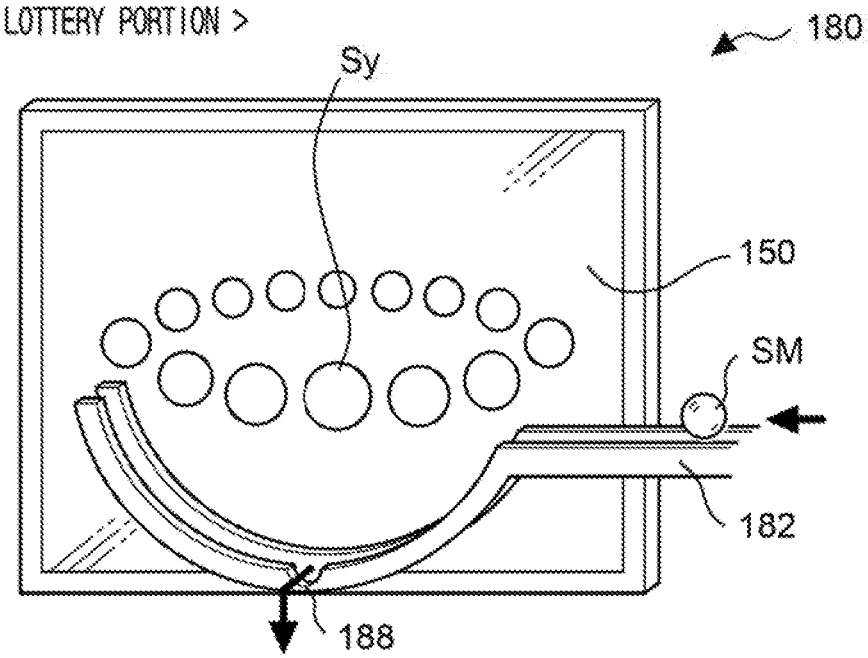
FIG. 11 is a diagram illustrating an example of a screen-front lottery portion.
Figure 12:
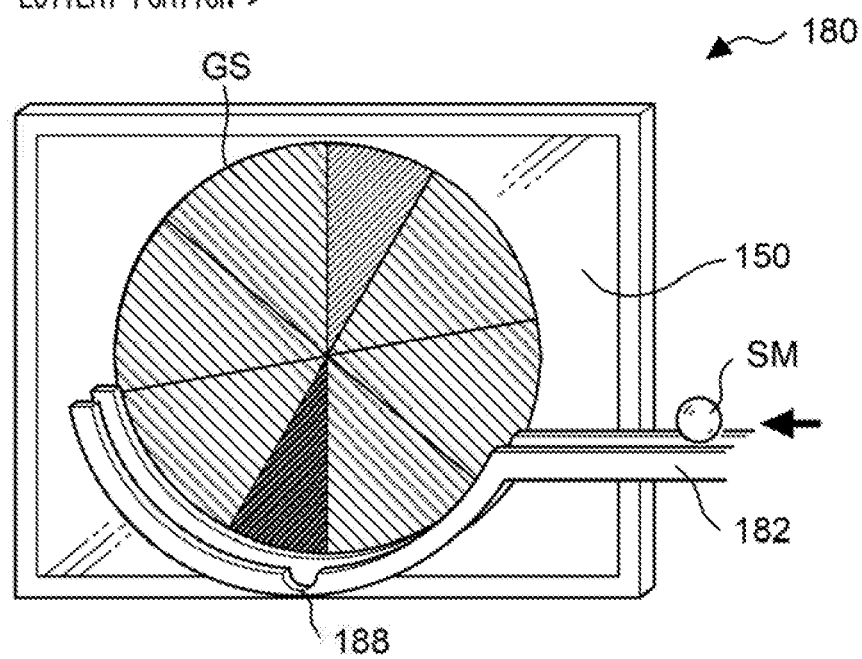
FIG. 12 is a diagram illustrating an example of the screen-front lottery portion.

A configuration of a screen-front lottery portion 180, which is omitted in FIG. 5 and FIG. 6 for convenience of explanation, will be described. FIG. 11 and FIG. 12 are diagrams each illustrating an example of the configuration of the screen-front lottery portion 180. The screen-front lottery portion 180 includes the display device 15 and a guide path 182. As shown in FIG. 11 and FIG. 12, the screen-front lottery portion 180 executes two types of lottery. As shown in FIG. 11 and FIG. 12, the guide path 182 is provided in front of a screen 150 as viewed from a player. The guide path 182 includes a straight portion and a semi-circular portion integral with the straight portion and open to an upper side, in order to guide small balls SM supplied from a path switcher, described later. A cutout 188 is provided near the center of the semicircular portion. This enables that a small ball SM supplied to the straight portion of the guide path 182 from the right side in FIG. 11 or FIG. 12 rocks from side to side in the semicircular portion and gradually falls from the cutout 188. A sensor (not shown) is provided near the cutout 188 to detect a timing at which a small ball falls from the cutout 188. The small ball SM having fallen from the cutout 188 is fed onto the pusher table 40 in the pusher game field 100. Meanwhile, in an example in FIG. 11, spherical symbols Sy are arranged annularly and are displayed while moving on a circular ring. At a timing when a small ball SM enters into the guide path 182 and falls from the cutout 188, a symbol Sy displayed on the frontmost side in the circular ring is selected.

In an example in FIG. 12, a circle Gs that rotates, for example, clockwise, is displayed on the screen 150. The circle Gs is divided into areas of sectors (hereinafter, called a "cell") expanding radially. At a timing when a small ball falls from the cutout 188, a cell positioned, for example, in a direction of six o'clock in the circle Gs is selected by a lottery.

There is a case in which some award is associated with one or more symbols or one or more cells. In this case, when a symbol or a cell associated with the reward is selected by a lottery, the reward is awarded to a player. For example, when a large ball BM falls into the front area 61 in the "pusher game", the number of small balls SM fed in the "marble chance" is decided by a lottery. The lottery at this time is executed by the screen-front lottery portion 180 in the following manner. That is, as shown in FIG. 11, while symbols Sy corresponding to the number of small balls SM are displayed on the screen 150 in an annular arrangement, at a timing when the small ball SM that entered into the guide path 182 falls from the cutout 188, a symbol Sy displayed on the front side in the annular arrangement is selected. The number associated with the selected symbol Sy becomes the number of small balls SM fed in the "marble chance" (technically, the number becomes a cumulative total of the number decided by a lottery, as described later). As described later, a case is assumed in which an event ends in the "marble chance". In this case, when a player inserts a predetermined value medium, the event is extended and the number of small balls SM fed again is decided by a lottery. The lottery at this time is also executed by the screen-front lottery portion 180. For example, in the "SS mode", described later, a lottery using the circle Gs as shown in FIG. 12 and the timing when a small ball falls from the cutout 188, is executed.

In the screen-front lottery portion 180, a lottery is executed using both a change of a virtual symbol displayed on the screen 150 (software processing) and a real physical phenomenon of a fall of a small ball SM, being a tangible object. In a lottery using only image display, an impression of manipulation (an impression that an already decided effect is displayed by rendering) may be given to a player. However, in the screen-front lottery portion 180, since a real physical phenomenon, such as a fall of a small ball SM, being a tangible object, is used together with the image display, a possibility to giving such an impression may be decreased.

Marble Chance

Next, the "marble chance" provided in the area 200 will be described.

Figure 13:
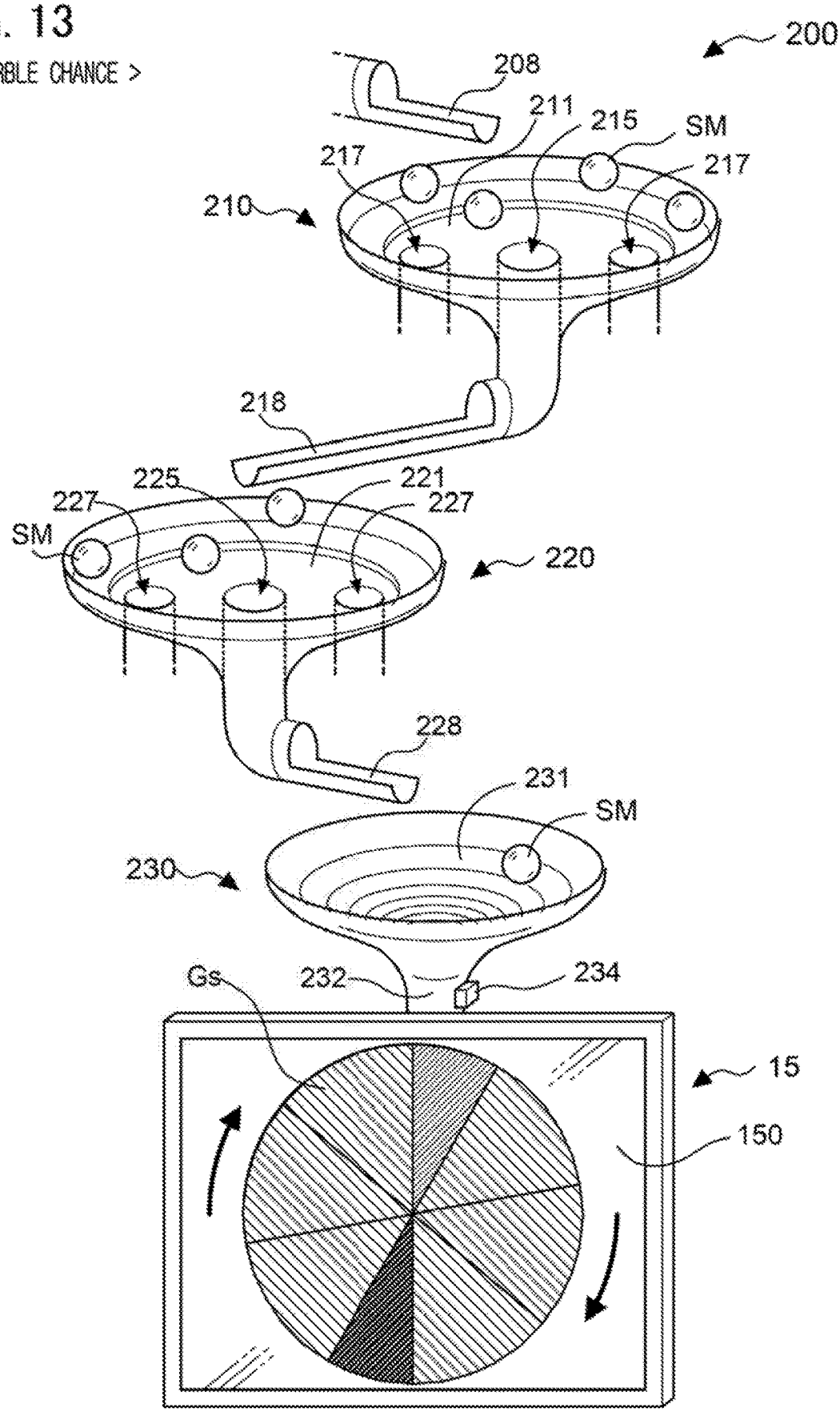
FIG. 13 is a diagram illustrating an example of a "marble chance"

FIG. 13 is a diagram illustrating an example of a mechanism that provides the "marble chance". As shown in FIG.

13, a guide path 208, a first distributer 210, a second distributer 220, an accessory 230, and the display device 15 are provided in the area 200.

The first distributer 210 is a plate-like member and is formed by, for example, a transparent or semi-transparent material. A bottom surface 211 of the first distributer 210 is inclined downward toward the center. A predetermined number of small balls SM are fed into the first distributer 210 through the guide path 208 such that the small balls SM roll along an inner wall portion of the first distributer 210. A hole 215 is provided near the lowest part of the bottom surface 211, which connects to a guide path 218. A plurality of holes 217 are provided at positions shallower than the hole 215, that is, around the hole 215. In an example of FIG. 13, two holes 217 are provided. The holes 217 are non-winning ports, which allows collection of small balls SM that have fallen into the holes 217 in a storage (described later), without the small balls SM entering into the second distributer 220. When a small ball SM falls into the hole 217, a reward may be awarded to a player.

The second distributer 220 is a plate-like member and is formed by, for example, a transparent or semi-transparent material, as in the first distributer 210. A bottom surface 221 of the second distributer 220 is inclined downward toward the center. The small balls SM that have fallen into the hole 215 are fed into the second distributer 220 through the guide path 228 such that the small balls SM roll along an inner wall portion of the second distributer 220. A hole 225 is provided near the lowest part of the bottom surface 221, which connects to the guide path 228. A plurality of holes (in the example of FIG. 13, two holes) 227 are provided at positions around the hole 225. The holes 227 are non-winning ports, which allow collection of small balls SM that have fallen into the holes 227 in the storage, without the small balls SM entering into the accessory 230. When a small ball SM falls into any one of the holes 227, a reward may be awarded to a player.

The accessory 230 is formed in a mortar shape of, for example, a transparent or semi-transparent material. An inner periphery 231 of the accessory 230 is inclined downward toward the center. The small balls SM that have fallen into the hole 225 are fed into the accessory 230 through the guide path 228 such that the small balls SM roll along the inner periphery 231 of the accessory 230. There is provided a sensor 234 in the pipe 232 near the lowest part of the inner periphery 231. The sensor 234 detects the passage of the small ball SM through a pipe 232. The reason each of the first distributer 210, the second distributer 220, and the accessory 230 is formed by a transparent or semi-transparent material is that a rolling state of small balls SM may be easily recognized by a player.

When the game state is the "marble chance", the circle Gs rotating, for example, clockwise, is displayed on the screen 150 of the display device 15, and the circle Gs is divided into cells of sectors expanding radially.

A central axis of the pipe 232 is positioned behind the display device 15 as viewed by a player, and at a position along a direction of substantially twelve o'clock of the circle Gs. The sensor 234 is positioned behind an outer peripheral edge of the circle Gs. In such a positional relationship, at a timing when the small ball SM that entered onto the accessory 230 passes through the pipe 232 and is detected by the sensor 234, a cell positioned in the direction of twelve o'clock (in a vertical direction), from among the cells in the circle Gs rotationally displayed, is selected. That is, among the cells of the rotating circle Gs, a cell into which the small ball SM that entered onto the accessory 230 appears as if the ball enters when viewed by a player, is selected by a lottery. This enables increase in the probability that the cell will be selected, as a central angle of the cell in the circle Gs becomes larger.

As is understood from the above descriptions, the lottery by the marble chance is executed in a plurality of stages including a first stage and a second stage. The first stage is a lottery using the first distributer 210, the second distributer 220, and the accessory 230 (a so-called physical lottery), and the second stage is a lottery using the circle Gs displayed on the display device 15.

In the example of FIG. 13, the circle Gs is divided into eight cells. Among these elements, when a specific cell is selected three times by a lottery, the game state transitions to the "marble JP chance". When another cell is selected three times by a lottery, the game state transitions to the "SS mode". Furthermore, when a small ball SM passes through the pipe 232 and a predetermined condition is satisfied, a reward is awarded to a player. The small ball SM having passed through the pipe 232 is collected in the storage.

In the "marble chance", the total number of accessories including distributers is not limited to three. The total number of holes in each of the first distributer 210 and the second distributer 220 are not limited to three. In the "pusher game", the display device 15 executes a normal slot game and the like. In the "marble chance", the display device 15 becomes a part of a lottery portion using a fall of a small ball SM. It may be considered that the display device 15 is positioned, spanning over the pusher game field 100 that provides the "pusher game" and the area 200 that provides the "marble chance". However, in the present embodiment, it is described that the display device 15 is present in the area 200 for the sake of convenience.

Marble JP Chance

Next, the "marble JP chance" provided in the area 300 will be described.

Figure 14:
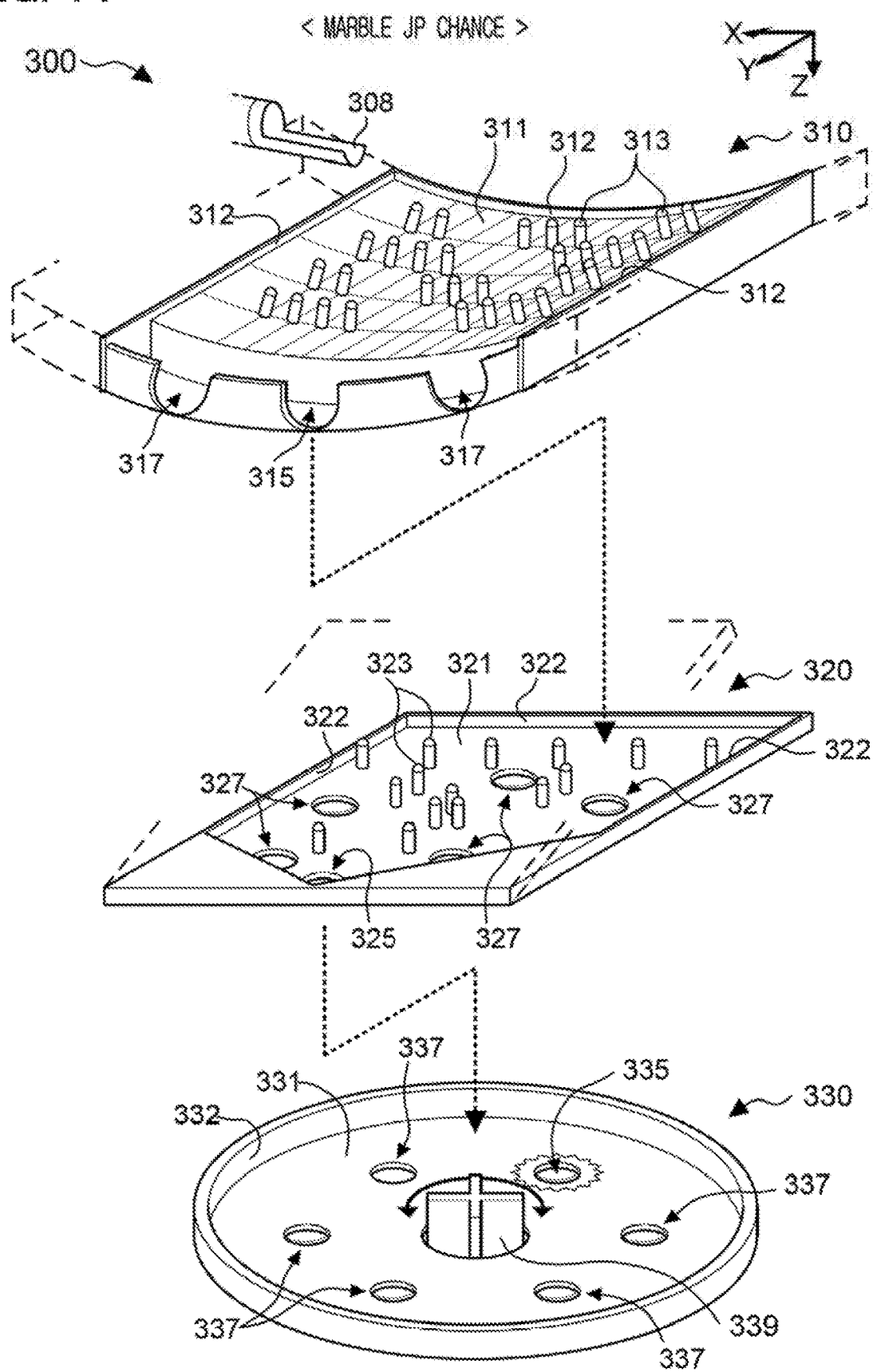
FIG. 14 is a diagram illustrating an example of a "marble JP chance"

FIG. 14 is a diagram illustrating an example of a mechanism that provides the "marble JP chance". In the mode shown in FIG. 14, the mechanism for the "marble JP chance" is shared over two station units ST positioned on a positive side in the Y direction in FIG. 1 and FIG. 2. As shown in FIG. 14, a guide path 308, a half pipe 310, a game board 320, and an accessory 330 are provided in the area 300.

The half pipe 310 has a semicylindrical shape open to the upper side. The half pipe 310 is inclined downward toward the front side (a positive side in the Y direction). The half pipe 310 also has wall portions 312 that prevent small balls SM from jumping out. The wall portions 312 are positioned on a rear side (a negative side in the Y direction), a left side (a positive side in the X direction), and a right side (a negative side in the X direction) on an inner periphery 311 of the half pipe 310. The half pipe 310 has pins 313 that regulate the movement of small balls SM, on the inner periphery 311. There are three holes through which a small ball SM can pass, at a front end of the half pipe 310. In detail, there are provided a hole 315 and two holes 317. The hole 315 is positioned at the center of the front end of the half pipe 310. One of the two holes 317 is positioned on the left side of the hole 315 and the other one is positioned on the right side of the hole 315. There are provided sensors (not shown). Among the sensors, one sensor corresponds to the hole 315 and the remaining sensors respectively correspond to the two holes 317. Therefore, it is possible to detect how many small balls SM have passed through which hole.

The half pipe 310 rocks from side to side as shown by a broken line in FIG. 13 by a drive mechanism (not shown).

This allows small balls SM to be entered into the rear end side of the half pipe 310 by the guide path 308 to move forward gradually and irregularly by the side to side rocking, while being regulated by the pins 313. The small balls SM having moved to the front end pass through either of the hole 315 or 317. Then only a small ball SM having passed through the hole 315, which is a winning port, is guided to the game board 320.

Small balls SM having passed through the hole 317 are not guided to the game board 320; however, a reward is awarded to a player according to the passage through the hole 317. For example, every time a small ball SM passes through the hole 317, the number of credits of a player is incremented by "5". It is to be noted that when the sensor detects that all the small balls SM that entered onto the half pipe 310 by the guide path 308 have passed through the holes 317, that is, none of the small balls SM has passed through the hole 315, the game state transitions to the "pusher game".

The game board 320 has a flat plate shape. There is provided wall portion 322 on the four sides on the upper surface 321 of the game board 320 to prevent small balls SM from jumping out. The game board 320 has pins 323 that regulate the movement of the small balls SM. The pins 323 are positioned on the upper surface 321. There are provided a hole 325 as a winning port and a plurality of (in an example of FIG. 14, five) holes 327. The hole 325 is positioned at the center on a front end side of the upper surface 321, and the holes 327 are positioned half-way from a rear end side to the front end side. The wall portion 322 has a diagonal V-shape in a direction from the middle of a left side and a right side toward the hole 325, on the front end side. It is to be noted that there are provided sensors (not shown). One sensor corresponds to the hole 325 and the remaining sensors correspond to the holes 327. Therefore it is possible to detect how many small balls SM that entered onto the game board 320 have passed through which hole.

The game board 320 is inclined downward toward the rear side (the negative side in the Y direction) in an initial state. However, as shown by a broken line in FIG. 14, the game board 320 repeats up-and-down movement, for example, such that the rear end is brought up centering around the front end, by a drive mechanism (not shown). Therefore, the small balls SM that have passed through the hole 315 of the half pipe 310 and have entered onto the game board 320 remain for a time on the rear end side of the upper surface 321. Upon the start of the up-and-down movement, the small balls SM gradually move to the front side, while being regulated by the pins 323. At the time of movement, the small balls SM fall into any one of the holes 327 on the way, or fall into the hole 325 eventually. Only a small ball SM that has fallen into the hole 325 that is a winning port is guided to the accessory 330.

The small ball SM that has passed through the hole 327 is not guided to the accessory 330, but a reward is awarded to the player according to the passage through the hole 327. For example, every time a small ball SM passes through the hole 327, the number of credits of a player is incremented by "5". It is desired that the up-and-down movement in the game board 320 be started at a timing when a predetermined time has passed, for example, after all the small balls SM entered onto the half pipe 310 have passed through the hole 315 or 317 (after being detected by the sensor). In other words, it is preferred that the game apparatus 10 be configured such that the up-and-down movement in the game board 320 is started at a timing at which it is assumed that all the small balls SM that have passed through the hole 315 remain on the rear end side of the upper surface 321 of the game board 320. Furthermore, when the sensor detects that all of the small balls SM that have passed through the hole 315 and entered onto the game board 320 have passed through the holes 327, that is, none of the small balls SM has passed through the hole 325, the game state transitions to the "pusher game".

The accessory 330 is a plate-like member. A bottom surface 331 of the accessory 330 is inclined downward toward the center. The accessory 330 has a wall portion 332 that prevents small balls SM from jumping out. The wall portion 332 is positioned at the rim of the bottom surface 331. There are a plurality of holes inside of the wall portion 332 on the bottom surface 331 substantially in a concyclic manner at regular intervals. In an example of FIG. 14, there are six holes. One hole 335 of these holes is a winning port, and the other holes 337 are non-winning ports. The accessory 330 also has a rotary impeller 339 that is near the lowest part (the center) of the bottom surface 331. Clockwise and counterclockwise rotations are alternately repeated, around a Z-axis direction as a rotational axis by a drive mechanism (not shown). The rotary impeller 339 is stopped in an initial state.

The small ball SM having passed through the hole 325 of the game board 320 and entered onto the accessory 330 rolls on the bottom surface 331 and comes into contact with the rotary impeller 339 that keeps stopping at the center of the bottom surface 331, to come to rest for a time. When the rotary impeller 339 starts rotation, the small ball SM reaches the wall portion 332 due to an impact of the rotary impeller 339 and performs circling movement along the wall portion 332. The small ball SM performing the circling movement along the wall portion 332 gradually slows down, decreasing a circling radius gradually. That is, the small ball SM moves toward the center. During movement, the small ball SM may fall into the hole 335 or any of the five holes 337, or may move in the central direction without falling. The small ball SM that moves in the central direction is hit again by the rotary impeller 339 to start circling movement. By repeating such movement, one or more small balls SM that entered onto the accessory 330 fall into any of the hole 335 or the holes 337.

If any of small balls SM falls into the hole 335, the game state transitions to the "marble JP". In other cases (if fails), that is, if all the small balls SM that have passed through the hole 325 and entered onto the accessory 330 fall into the holes 337, the game state transitions to the "pusher game".

When transition from the "marble JP chance" to the "marble JP" fails, the same number of small balls SM as the number of small balls SM having entered onto the half pipe 310 in the "marble JP chance" are stored in a ceiling storage 500. The reason is that when a transition from the "marble JP chance" to the "marble JP" fails, the number of small balls SM having entered onto the half pipe 310 are accumulated as a reward for a player who acquires the "marble JP" in a subsequent game.

When a small ball SM passes through the hole 337, a reward is awarded to a player. For example, every time one small ball SM passes through the hole 337, the number of credits of a player is incremented by "1". It is also desired that the rotation of the rotary impeller 339 be started at a timing when a predetermined time has passed after all the small balls SM that entered onto the game board 320 have passed through the hole 325 or 327 (after being detected by the sensor). In other words, it is preferred that the game apparatus 10 be configured such that the rotation of the rotary impeller 339 is started at a timing when it is assumed that all the small balls SM that have passed through the hole 325 have come into contact with the rotary impeller 339 and have come to rest.

The mechanism in FIG. 14 that provides the "marble JP chance" shown above is expressed comprehensively as a lottery machine using game objects (for example, small balls SM). For example, a lottery machine according to a preferred mode includes a lottery structure that supports the game objects, and a drive mechanism that moves the lottery structure. The lottery structure is, for example, the half pipe 310 or the game board 320.

The lottery structure includes a lottery field onto which the game objects are fed, and openings through which the game objects that have been fed onto the lottery field can pass. The lottery field is a surface on which the game objects are placed. For example, the inner periphery 311 of the half pipe 310 or the upper surface 321 of the game board 320 correspond to the lottery field. The game objects can roll on the lottery field.

A specific example of the openings of the lottery structure is, for example, the holes (315, 317) of the half pipe 310, or the holes (325, 327) of the game board 320. Movement of the lottery structure means a change in the angle or the position of the lottery structure, for example, right-to-left rocking of the half pipe 310 or the up-and-down movement of the game board 320. A movement pattern of the lottery structure is not limited to the examples described above (the right-to-left rocking or the up-and-down movement).

In the configurations described above, the game objects on the lottery field gradually move on the lottery field by the movement of the lottery structure, and as a result, pass through any one of the openings. In other words, the game objects temporarily remain on the lottery field and then reach any one of the openings.

Marble JP

In the "marble JP chance", when a small ball SM falls into the hole 335, the game state transitions to the "marble JP". In the "marble JP", as described above, small balls stored in the ceiling storage are discharged at the same time toward the "pusher game".

SS mode

In the "marble chance", if one specific cell in the circle Gs is selected three times or more in a lottery, the game state transitions to the "SS mode". The "SS mode" is a lottery game in which many rewards may be anticipated by using, for example, the screen 150 of the display device 15. The game state may transition to the "marble JP chance" according to the result of the lottery. When the game state transitions to the "SS mode", a predetermined reward is awarded to a player. For example, "100" may be added to the amount of credits of a player, or a predetermined number of small balls SM may be fed by the small ball feeders 172L and 172R.

The "SS mode" includes a variable probability slot game (see FIG. 8) and a lottery by the screen-front lottery portion 180 (see FIG. 12). First, in the "SS mode", a predetermined number of variable probability slot games are executed. A reward for the variable probability slot game in the "SS mode" may be the same as that of the variable probability slot game in the "pusher game", or may be different (higher). The number of executions of the variable probability slot game may be decided by a lottery by the screen-front lottery portion 180 (see FIG. 11) when the game state transitions to the "SS mode". In a case in which execution of the predetermined number of variable probability slot games ends, the number of executions may be decided again by a lottery, and then the number of executions of the variable probability slot game may be incremented by the number decided by the lottery.

When the variable probability slot game ends, a lottery by the screen-front lottery portion 180 is executed next. Specifically, a lottery using the circle Gs as shown in FIG. 12 and the timing at which a small ball SM falls from the cutout 188 is executed. The number of lotteries to be executed may be decided by a lottery by the screen-front lottery portion 180, as in the number of executions of the variable probability slot game. The circle Gs in FIG. 12 rotates, for example, clockwise. The circle Gs is divided into cells of sectors expanding radially. Rewards, for example, "continue", transition to the "marble JP chance", and the like are assigned to each of the cells. In the "SS mode", at a timing at which a small ball SM falls from the cutout 188, a cell positioned in a direction of six o'clock is selected from among the cells in the circle Gs. If "continue" is assigned to the selected cell, a predetermined number is added to the number of executions of the variable probability slot game. For example, ten times "10" is added to the number of executions of the variable probability slot game. Then a reward assigned to the selected cell is awarded to a player. However, if the cell "continue" is selected, the selected cell is changed to "end". If the cell "end" is selected by a lottery, the reward is reset to, for example, "100", which is an initial value. The cell changed to "end" is reset to "continue" at the time of the end of the "SS mode". When the cell "continue" is selected, a reward different from addition of the amount of credits may be awarded, together with increment of the number of executions of the variable probability slot game. Alternatively, another reward may be awarded together with the addition of the amount of credits. Furthermore, the cells in the circle Gs may include a cell of "special continue" to which addition of the number of executions of the variable probability slot game and discarding of a special reward are assigned, separately from the cell "continue". The cell "special continue" is different from the cell "continue". Even if the cell "special continue" is selected by a lottery, the cell is not changed to "end" and a value of the reward increases every time it is selected. For example, "200" is added to the amount of credits of a player as a reward when the cell "special continue" is first selected. When the same cell "special continue" is selected next, "300" is added. Thereafter, an added amount of the amount of credits increases by "100", such as "400" to "500", every time the cell of "special continue" is selected.

In the variable probability slot game in the "SS mode", the game state transitions to the "marble JP chance" if number symbols "7" are lined up, if the "direct JP" symbols are lined up, or if a cell assigned with transition to the "marble JP chance" is selected as a result of the lottery by the screen-front lottery portion 180. If lotteries by the screen-front lottery portion 180 are executed for the number decided by the lottery, without transition of the game state to the "marble JP chance", the "SS mode" ends and the game state returns to the "pusher game" (see FIG. 4).

Routes of Small Balls and Large Balls

Next, routes of small balls SM and large balls BM in the station unit ST will be described.

Figure 15:
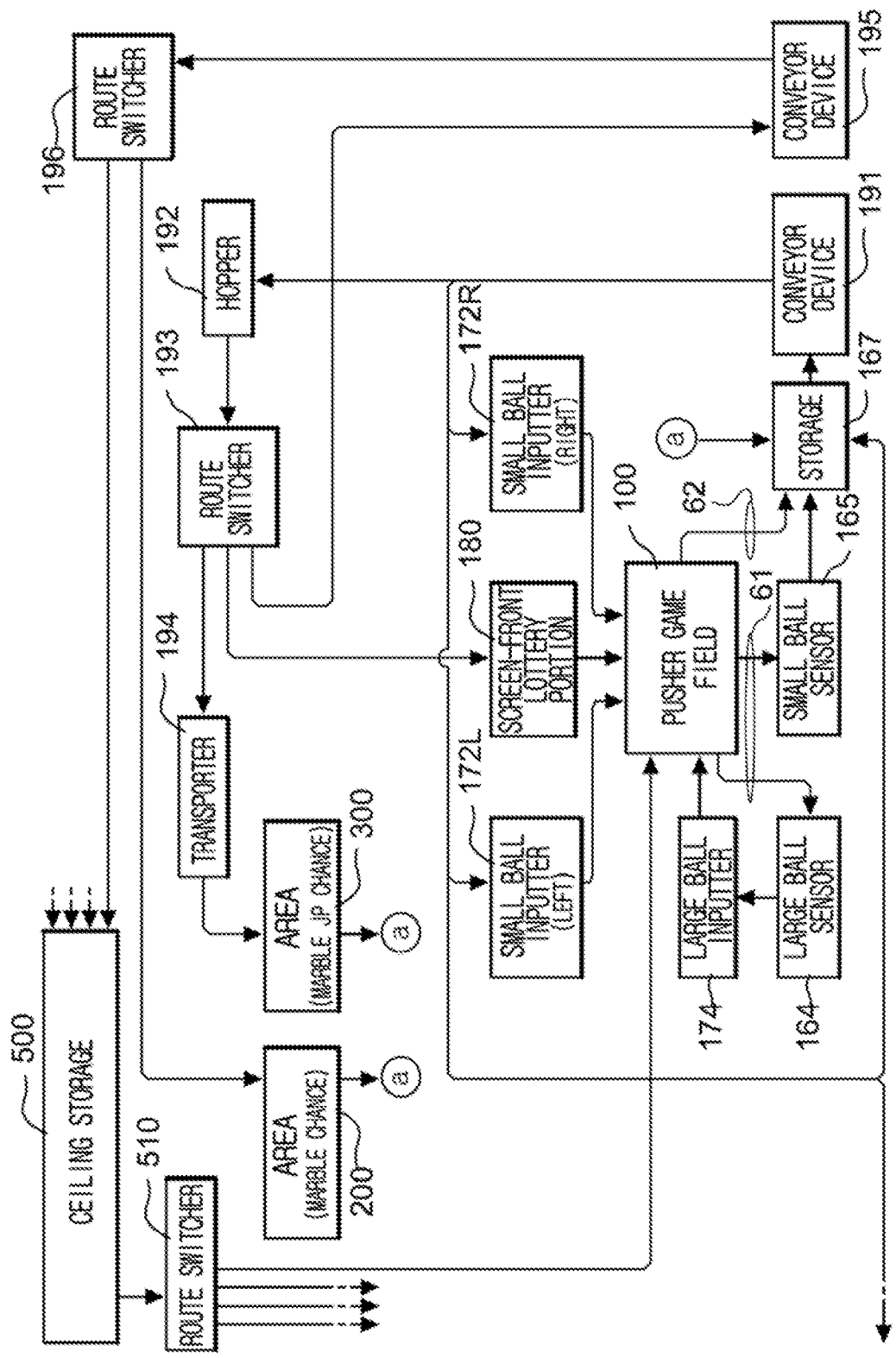
FIG. 15 is a diagram illustrating an example of routes of small balls and large balls in the station unit.

FIG. 15 is a diagram illustrating an example of routes of small balls SM and large balls BM. In FIG. 15, the ceiling storage 500 and a route switcher 510 are shared by the four station units ST. However, other elements are included in each of the station units ST. As described above, small balls SM are fed to the pusher game field 100 by the small ball feeders 172L and 172R in response to an operation of a player. There may be a case in which small balls SM used in a lottery by the screen-front lottery portion 180 are fed to the pusher game field 100, or there may be a case in which a large number of small balls SM stored in the ceiling storage 500 are fed to the pusher game field 100 via the route switcher 510, other than from the small ball feeders 172L and 172R.

In the pusher game field 100, small balls SM fall into the front area 61 or the side areas 62. When a small ball sensor 165 detects that small balls SM have fallen into the front area 61, the small balls SM are collected in a storage 167. Since small balls SM that have fallen into the side areas 62 "fall from side holes", these balls are collected in the storage 167 without being detected by the small ball sensor 165.

The small balls SM collected in the storage 167 are transported to an upper side (the negative side in the Z direction) than the pusher table 40 by a conveyor device 191. The conveyor device 191 is a screw lifter that transports small balls SM by rotating, for example, a spiral member along a central axis. Small balls SM transported by the conveyor device 191 roll in a predetermined route by their own weight and reach a hopper 192, the small ball feeders 172L and 172R, the storage 167, or a storage of another station unit ST adjacent thereto in the X direction. In other words, in one particular station unit ST, small balls SM that are not supplied to any of the hopper 192 and the small ball feeders 172L and 172R circulate in the storage 167 and the conveyor device 191, or reach the storage of another station unit ST adjacent thereto in the X direction.

The hopper 192 discharges a specified number of small balls SM based on an instruction from an operation instructor, described later, toward a route switcher 193. The route switcher 193 selects any of a transporter 194, the screen-front lottery portion 180, or the conveyor device 195 as a route for supplying small balls SM, and supplies the small balls SM to the selected route.

The transporter 194 transports the supplied small balls SM to the guide path 308 of the area 300 (see FIG. 14), when the route switcher 193 selects the transporter 194. It is preferred that the transporter 194 be configured to be visually appealing in the transport of small balls SM to a player, such as a Ferris wheel (not shown).

A case is assumed in which the game state transitions to the "marble JP chance". In this case, when the route switcher 193 selects the transporter 194 as a supply route, and the hopper 192 discharges the specified number of small balls SM, the specified number of small balls SM are entered onto the half pipe 310 via the route switcher 193, the transporter 194, and the guide path 308. In the "marble JP chance", small balls SM that entered onto the half pipe 310 fall into any of the holes 317, 327, 335, or 337 and then are collected in the storage 167.

When a lottery by the screen-front lottery portion 180 is executed, the route switcher 193 selects the screen-front lottery portion 180 as the supply route, and the hopper 192 discharges the specified one small ball SM. This allows one small ball SM to be entered to the guide path 182 of the screen-front lottery portion 180. It is to be noted that one small ball SM that entered into the guide path 182 is fed to the pusher game field 100 (the pusher table 40) from the cutout 188.

The conveyor device 195 includes a cylindrical member through which small balls SM can pass, and transports small balls SM by the air circulating in the cylindrical member. When the route switcher 193 selects the conveyor device 195 as the supply route, the conveyor device 195 transports the supplied small balls SM to a route switcher 196. The route switcher 196 selects either of the ceiling storage 500 or the area 200 as a route for supplying small balls SM based on an instruction from the operation instructor, and supplies small balls SM to the selected route. A case is assumed in which the game state transitions to the "marble chance". In this case, when the route switcher 193 selects the conveyor device 195, as the supply route, the route switcher 196 selects the area 200, and the hopper 192 discharges the specified number of small balls SM, and the specified number of small balls SM is fed to the first distributer 210 via the route switcher 193, the conveyor device 195, the route switcher 196, and the guide path 208 (see FIG. 13). In the "marble chance", the small balls SM fed to the first distributer 210 fall into any of the holes 217, 227, or the pipe 232, and then are collected in the storage 167.

Furthermore, when the route switcher 193 selects the conveyor device 195, as the supply route, the route switcher 196 selects the ceiling storage 500, the hopper 192 discharges the specified number of small balls SM, and the specified number of small balls SM is supplied to the ceiling storage 500 via the route switcher 193, the conveyor device 195, and the route switcher 196.

The ceiling storage 500 stores small balls SM supplied from the four station units ST, which are used in the "marble JP", and discharges all the stored small balls SM toward the route switcher 510 based on an instruction from the operation instructor. The ceiling storage 500 (not shown in FIG. 1 or FIG. 2) is preferably configured by a transparent or semi-transparent material such as acrylic so that a player can view the storage state (how many balls are stored) near the ceiling of the game apparatus 10. The route switcher 510 selects any one of the four station units ST as the transport route of small balls SM based on an instruction from the operation instructor.

Specifically, in a case in which the game state transitions to the "marble JP" in any one of the four station units ST, the route switcher 510 selects, as the supply route, a station unit ST in which the game state has transitioned to the "marble JP". Then the ceiling storage 500 discharges all the small balls SM stored therein toward the route switcher 510. This allows all the small balls SM stored in the ceiling storage 500 to be fed to the pusher game field 100 in the station unit ST in which the game state has transitioned to the "marble JP".

Hardware Configuration in Station

Figure 16:
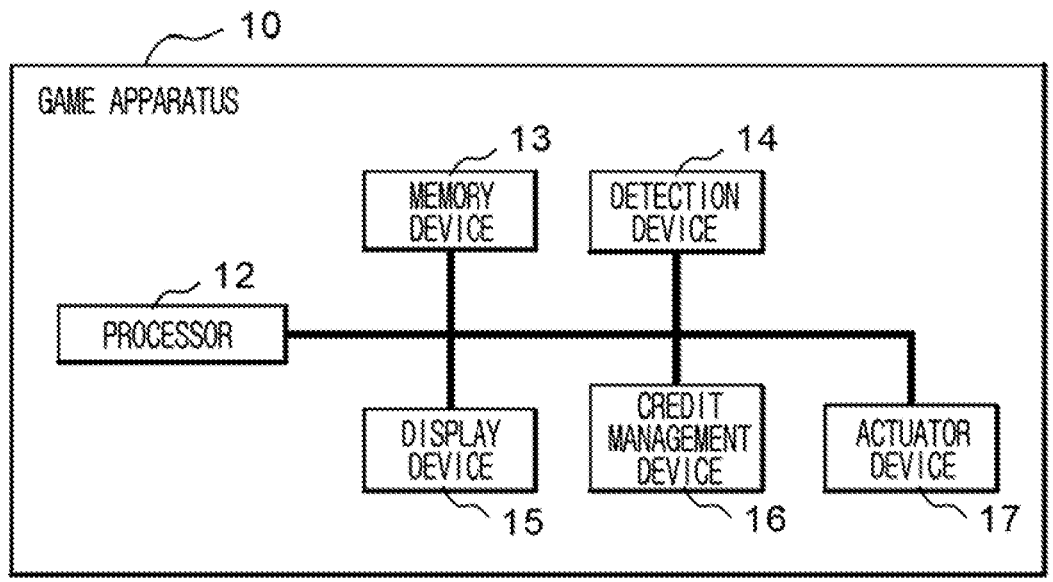
FIG. 16 is a block diagram illustrating an example of a configuration of the game apparatus.

FIG. 16 is a diagram illustrating an example of a hardware configuration in the game apparatus 10. As shown in FIG. 16, the game apparatus 10 includes a processor 12 that controls each of the portions, a memory device 13, a detection device 14, the display device 15, a credit management device 16, and an actuator device 17. Although the game apparatus 10 includes four station units ST in this example, only one station unit ST will be described for the sake of convenience of explanation.

The memory device 13 includes, for example, a hard disk drive (and/or a solid state drive) that records thereon various pieces of information and programs in a non-volatile manner, or a memory device such as a RAM (Random Access Memory) that records therein various pieces of information in a volatile manner. The processor 12 is, for example, a CPU (Central Processing Unit), and executes programs stored in the memory device 13 to provide various functions (details thereof described later) required for game processing. The number of the processor 12 is not necessarily one. A plurality of processors may perform various functions required for the game processing independently or in cooperation.

The detection device 14 is configured by sensors and buttons provided in the station unit ST. The detection device 14 outputs button information, detection information obtained by these sensors and other similar information. Examples of these sensors include the small ball sensor 165, a large ball sensor 164, the sensor 234, sensors provided corresponding to each of the checker 51 and the checkers 53, a sensor that detects small balls SM that have fallen from the cutout 188, and sensors provided corresponding to each of the holes 215, 217, 225, 227, 315, 317, 325, 327, 335, and 337. The display device 15 is provided at a position described above with reference to FIG. 5 and FIG. 13. The display device 15 is a flat display panel, such as a liquid crystal display panel or an organic EL (Electro-Luminescence) display panel, and displays various screens based on control by the processor 12.

The credit management device 16 converts tickets, money, token coins, or the like inserted to the slots 482L and 482R by a player into credits, and adds the converted credits to the amount of credits that may be used by the player in the game apparatus 10. There is a case in which a server device (not shown) stores therein the balance of credits held by a player who plays a game in the station unit ST or the game value (money, token coins, or the like) corresponding to credits. In this case, upon receipt of an instruction to withdraw the game value from the server device by an instruction of the player, the credit management device 16 adds the credits corresponding to the withdrawn game value to the amount of credits that may be used by the player in the station unit ST. Furthermore, upon receipt of an instruction to deposit the game value from the server device by an instruction of the player, the credit management device 16 outputs, to the server device, a command to add a game value corresponding to a part or the entirety of the number of credits that may be used by the player in the station unit ST, to the balance of the player stored in the server device. Upon receipt of an operation of the payout button 483 by the player, the credit management device 16 pays the value medium (for example, token coins) corresponding to a part or the entirety of the number of credits that may be used by the player in the station unit ST from a payout port M.

The actuator device 17 is configured by actuators provided in the station unit ST. Each of the actuators operates in response to an instruction of the processor 12. Specifically, examples of the actuator include the large ball feeder 174, the hopper 192, the route changers 193, 196, and 510, and the like.

A configuration of one station unit ST has been described with reference to FIG. 16. However, each of the station units ST includes the detection device 14, the display device 15, the credit management device 16, and the actuator device 17, and the processor 12 performs game processing for each of the four station units ST. Since the route switcher 510 is shared by the four station units ST, in the game processing, which station unit ST has transitioned to the "marble JP" is monitored. Furthermore, since the area 300 in which the "marble JP chance" is provided is shared by two station units ST adjacent to each other in the X direction, which station unit ST has transitioned to the "marble JP chance" is monitored in the game processing.

Functional Configuration by Processor or the Like

Next, a configuration will be described of various functions implemented by the processor 12 by executing the program.

Figure 17:
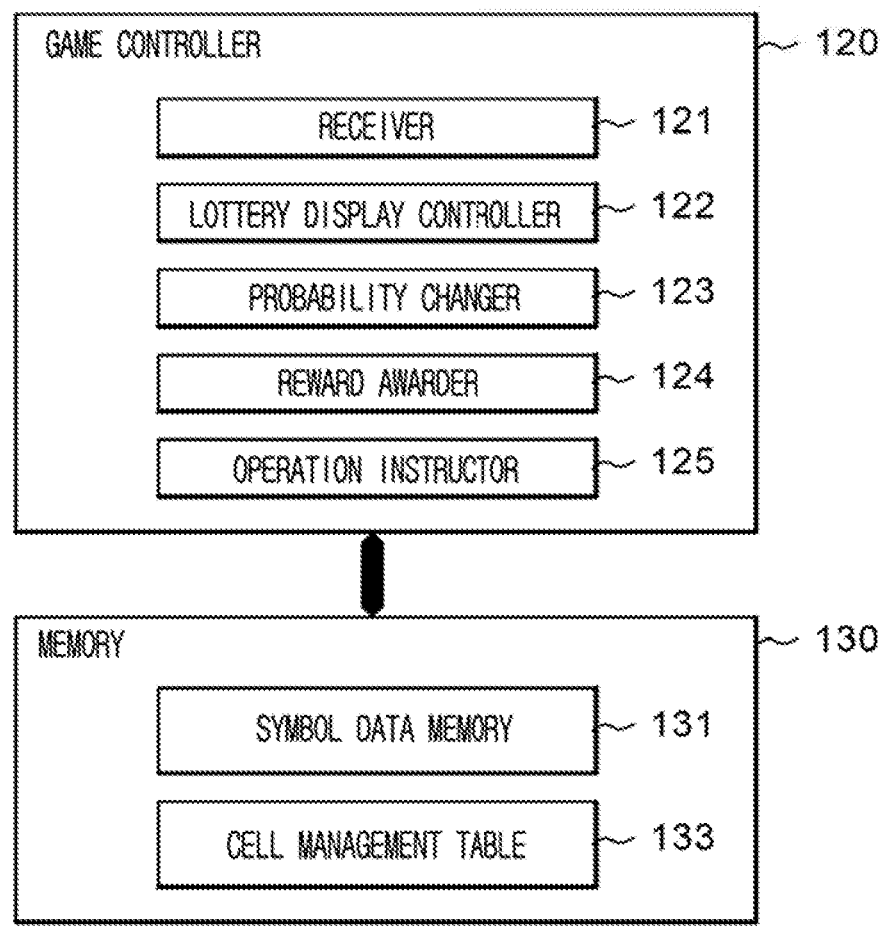
FIG. 17 is a block diagram illustrating an example of functions implemented by a CPU in the game apparatus.

As shown in FIG. 17, a game controller 120 is realized by the processor 12. A memory 130 that is read by the game controller 120 is realized by the memory device 13. The game controller 120 includes a receiver 121, a lottery display controller 122, a probability changer 123, a reward awarder 124, and an operation instructor 125. The receiver 121 receives various pieces of information output from the detection device 14 (see FIG. 16). The lottery display controller 122 controls the contents of a lottery displayed on the screen 150. Specifically, the lottery display controller 122 controls, on the screen 150, various screens, such as a lottery screen in the normal slot game or the variable probability slot game, a lottery screen of the number of small balls SM to be fed to the "marble chance" when a large ball BM falls into the front area 61, and a screen of the circle Gs displayed in the "marble chance". A lottery may be executed by using a combination of detection of small balls SM that are tangible objects, and a slot game, that is, a screen display alone by the lottery display controller 122. As in the "marble chance", a lottery may be executed by using the first distributer 210, the second distributer 220, and the display device 15. Thus the lottery display controller 122 may be referred to as a part or the entirety of the lottery portion.

If transition from "marble chance" to the "marble JP chance", or transition from "marble chance" to the "SS mode" fails, the probability 20o changer 123 changes a display area (a central angle) of a red cell and/or a blue cell of the circle Gs in the next "marble chance". As described above, in the "marble chance", at a timing at which small balls SM fed to the accessory 230 pass through the pipe 232 and are detected by the sensor 234, a cell positioned in the direction of twelve o'clock, from among the cells in the circle Gs, is selected. Therefore, when a central angle of, for example, the red (blue) cell in the circle Gs is enlarged, the probability that the red (blue) cell will be selected is increased by the enlarged portion in the next "marble chance". That is, the probability changer 123 changes the probability that the red (blue) cell will be selected.

The reward awarder 124 awards a player a reward. The reward awarder 124 awards a player a reward when a small ball SM or a large ball BM falls into the front area 61, and when a win is established, for example. Examples of a case in which a win is established include a case in which the same symbols are lined up on one line in the normal slot game or the variable probability slot game. The reward awarder 124 awards a player a reward in various cases other than those described above.

The operation instructor 125 instructs the actuator device 17 to perform various operations when predetermined conditions are satisfied. Specifically, the operation instructor 125 instructs the large ball feeder 174 to feed a large ball BM, instructs the hopper 192 of the number of discharges of small balls SM, and instructs each of the route switchers 193, 196, and 510 to select a supply route.

The memory 130 includes a symbol data memory 131 and a cell management table 133. The symbol data memory 131 stores therein image data of each symbol to be used in the slot game and the lottery in the "pusher game", the "SS mode", and the like. Specifically, examples of the image data of each symbol to be used in the slot game include image data representative of numbers from "1" to "9" and image data representative of each of symbols of the "BIG marble" and the "direct JP". Other than those, examples of the image data include symbols to be used at the time of deciding the number of small balls SM by a lottery, and symbols to be used at the time of deciding the number of additions of the variable probability slot game by a lottery. The probability of occurrence is preset for each of the symbols. This allows the lottery display controller 122 to cause each symbol to appear with the probability set to the symbol at the time of executing a lottery.

Figures 21, 22:
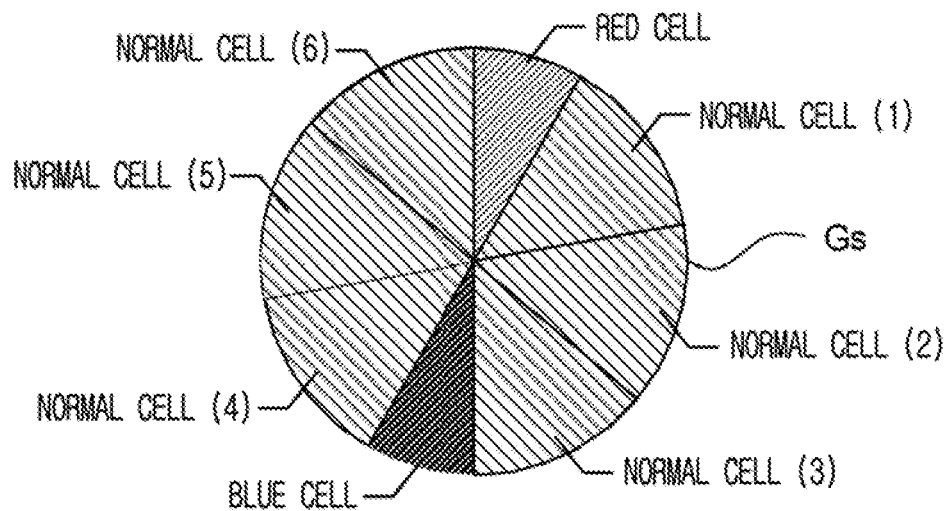
FIG. 21 is a diagram illustrating an example of a screen at the time of the marble chance.
FIG. 22 is a diagram illustrating an example of contents in a cell management table.

It will be described the circle Gs displayed on the screen 150 in the "marble chance" and the like. FIG. 21 is a diagram illustrating an example of the circle Gs. As shown in FIG. 21, the circle Gs is sectioned radially clockwise into a red cell, a normal cell (1), a normal cell (2), a normal cell (3), a blue cell, a normal cell (4), a normal cell (5), and a normal cell (6). Each of these cells is an example of a lottery element. When the red cell is selected three times in, for example, the "marble chance", the game state transitions to the "marble JP chance". When the blue cell is selected three times in, for example, the "marble chance", the game state transitions to the "SS mode". Each of the normal cells (1) to (6) receives an attribution. The red cell and the blue cell are an example of a specific lottery element.

The cell management table 133 defines a central angle and an attribute of each of the cells in the circle Gs, as follows. Specifically, the cell management table 133 defines, as shown in FIG. 22, the central angle of the red cell, the central angle of the blue cell, each of the central angles of the normal cells (1) to (6), and each of attributes of the normal cells (1) to (6). The attributes of the normal cells (1) to (6) are "credit reward" or "addition of lottery balls". Among these elements, the "credit reward" refers to a state in which a credit reward is awarded to a player when a corresponding normal cell is selected in the "marble chance". The "addition of lottery balls" refers to a state in which a predetermined number of small balls SM are additionally fed to the first distributer 210, when a corresponding normal cell is selected in the "marble chance". For example, ten small balls SM are additionally fed. FIG. 22 illustrates an example in which the attributes of the normal cells (1), (3), and (5) are "credit reward", and the attributes of the normal cells (2), (4), and (6) are "addition of lottery balls". The red cell and the blue cell do not have an attribute and in the column of attribute, these are shown as "–".

The cell management table 133 shown in FIG. 22 indicates the initial state of the circle Gs, in which the central angle of each of the red cell and the blue cell is 30 degrees (3/36 in terms of probability), and the central angle of each of the normal cells (1) to (6) is 50 degrees (5/36 in terms of probability). It is to be noted that the state of each cell in the circle Gs shown in FIG. 21 is regulated by the cell management table 133 shown in FIG. 22. The normal cell having the "attribute" of "credit reward" and the normal cell having the "attribute" of "addition of lottery balls" are not distinguished from each other clearly in FIG. 22. However, these cells may be clearly distinguished from each other by a method of, for example, changing the color or adding a different mark.

Next, game processing provided in the station unit ST will be described, mainly for the "pusher game" and the "marble chance".

Processing in Pusher Game

As described above, small balls SM that move over the edge 42 by the reciprocating motion of the pusher table 40 and are guided to the guide path 44 may pass the checker 51 or checkers 53 according to the position of the pusher table 40 when the small balls SM have fallen from the guide path 44. First, it will be processing for a case in which a small ball SM passes through the checker 51 or one of the checkers 53.

Figure 18:
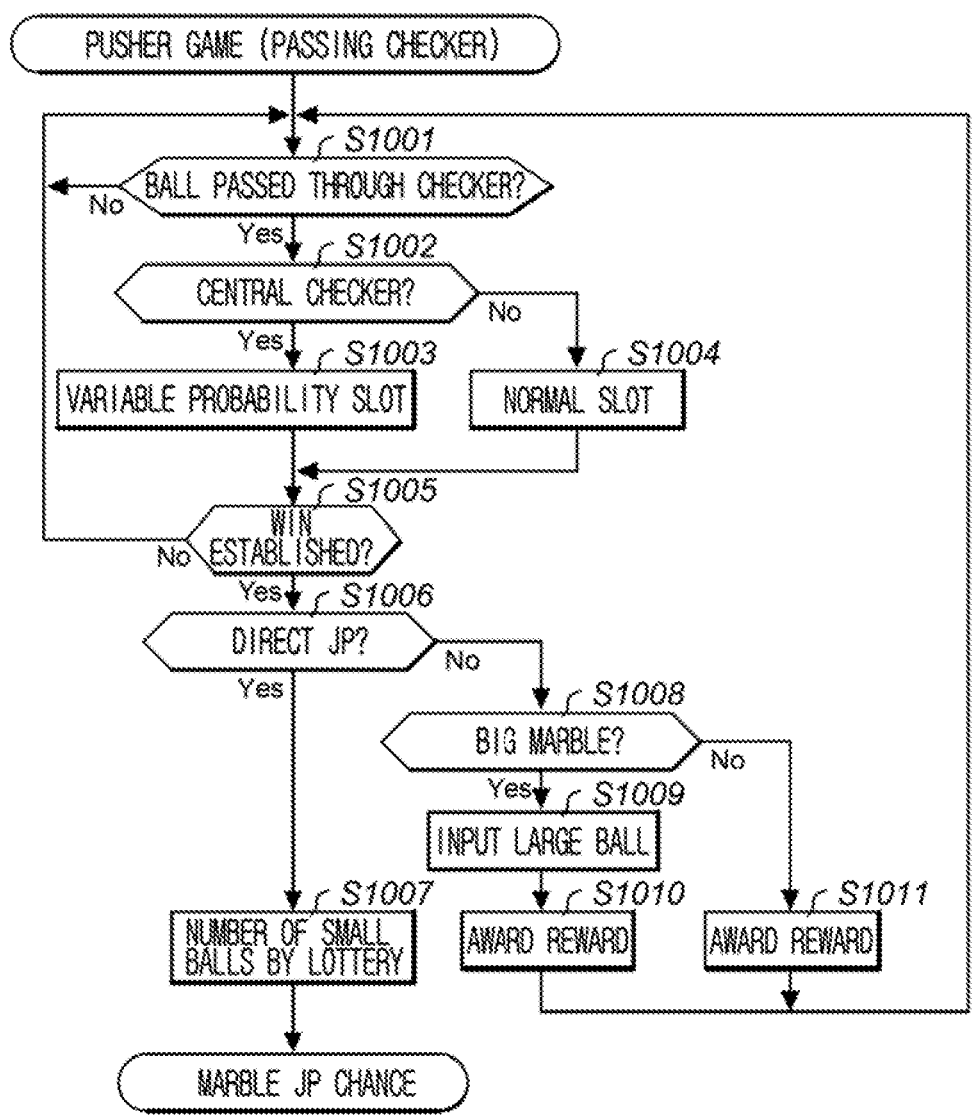
FIG. 18 is a flowchart illustrating processing in a pusher game.

FIG. 18 is a flowchart illustrating an example of the processing. First, the game controller 120 determines whether a small ball SM has passed through either the checker 51 or one of the checkers 53 (Step S1001). When the game controller 120 determines that a small ball SM has not passed through either the checker 51 or one of the checkers 53 (NO in a determination result at Step S1001), the game controller 120 returns the procedure to Step S1001. This allows the procedure not to proceed if a small ball SM has not passed through either the checker 51 or one of the checkers 53.

When the game controller 120 determines that a small ball SM has passed through any one of the checker 51 and the checkers 53 (YES in the determination result at Step S1001), the game controller 120 determines whether the small ball SM has passed through the checker 51 (Step S1002). If the small ball SM has passed through the checker 51 (YES in a determination result at Step S1002), the game controller 120 executes the variable probability slot game as shown in FIG. 8 (Step S1003). Conversely, if a small ball SM has not passed through the checker 51 (NO in the determination result at Step S1002), this means that the small ball SM has passed through one of the checkers 53. If the small ball SM has passed through that checker 53, the game controller 120 executes the normal slot game as shown in FIG. 7 (Step S1004).

The game controller 120 determines whether a win is established by the variable probability slot game or the normal slot game (Step S1005). When the game controller 120 determines that a win is established (YES in a determination result at Step S1005), the game controller 120 determines whether the established win is a win of the "direct JP" (Step S1006). As described above, a win of the "direct JP" includes two cases: a case in which the "direct JP" symbols are lined up at least on one line (see FIG. 10); and a case in which the number symbols "7" are lined up at least on one line. When a win is established by either one of the cases described above (YES in a determination result at Step S1006), the game controller 120 decides the number of small balls SM to be fed in the "marble JP chance" by a lottery (Step S1007). It is to be noted that a difference may be provided between the abovementioned two cases, such as in the following manner. If the "direct JP" symbols are lined up, the game controller 120 decides the number of small balls SM, for example, in a range from 30 to 50 by a lottery, and if the number "7" symbols are lined up, the game controller 120 decides the number of small balls SM, for example, up to 150 as an upper limit, by a lottery. The lottery may be executed, for example, by the screen-front lottery portion 180. After having decided the number of small balls SM by lottery, the game controller 120 causes the game state to transition to the "marble JP chance". This enables the game state to directly transition from the "pusher game" to the "marble JP chance", without via the "marble chance".

Conversely, in case in which the game controller 120 determines that a win is established, when the established win is not a win of the "direct JP" (NO in the determination result at Step S1006), the game controller 120 determines whether the established win is a win of the "BIG marble" (see FIG. 9) (Step S1008). If the established win is a win of the "BIG marble" (YES in a determination result at Step S1008), the game controller 120 causes one large ball BM to be fed to the table 30 (Step S1009). Specifically, the operation instructor 125 in the game controller 120 instructs the large ball feeder 174 to feed one large ball BM. After the feed of the large ball BM, the game controller 120 awards a player a reward (Step S1010), for example, adds the amount of credits by "10" and returns the procedure to Step S1001.

When the game controller 120 determines that a win is established, if the established win is not a win of the "direct JP" nor a win of the "BIG marble" (NO in the determination result at Step S1008), this means that it is a win because number symbols "1" to "6", "8", or "9" excluding "7" are lined up. Therefore, the game controller 120 awards a player a reward according to the lined up number, as described above (Step S1011). Thereafter, the game controller 120 returns the procedure to Step S1001.

During a period in which a lottery is being executed by the normal slot game or the variable probability slot game by the passage of a small ball SM though the checker 51 or one of the checkers 53, another small ball SM may pass through the checker 51 or one of the checkers 53. In this case, the number of small balls SM having passed through the checker 51 is stored in the memory 130 during the lottery by the slot game. The game controller 120 decrements the number of small balls SM, which is stored in the the memory 130, by "1", after the end of the lottery by the slot game to start the next slot game. As the number of the small balls SM, which is stored in the memory 130, increases, the odds to be multiplied to a reward may increase. A reward when a win is established in two or more lines in the variable probability slot game may increase, as compared with a reward when a win is established in one line in the normal slot game.

In the "pusher game", even if a small ball SM falls into the side areas 62, as described above, the small ball SM is collected in the storage 167, and thus no special processing is performed. Furthermore, a large ball BM does not fall into the side areas 62 due to the blindfold plate or the like, as described above. Next, processing will be described for cases in which a small ball SM or a large ball BM falls into the front area 61.

Figure 19:
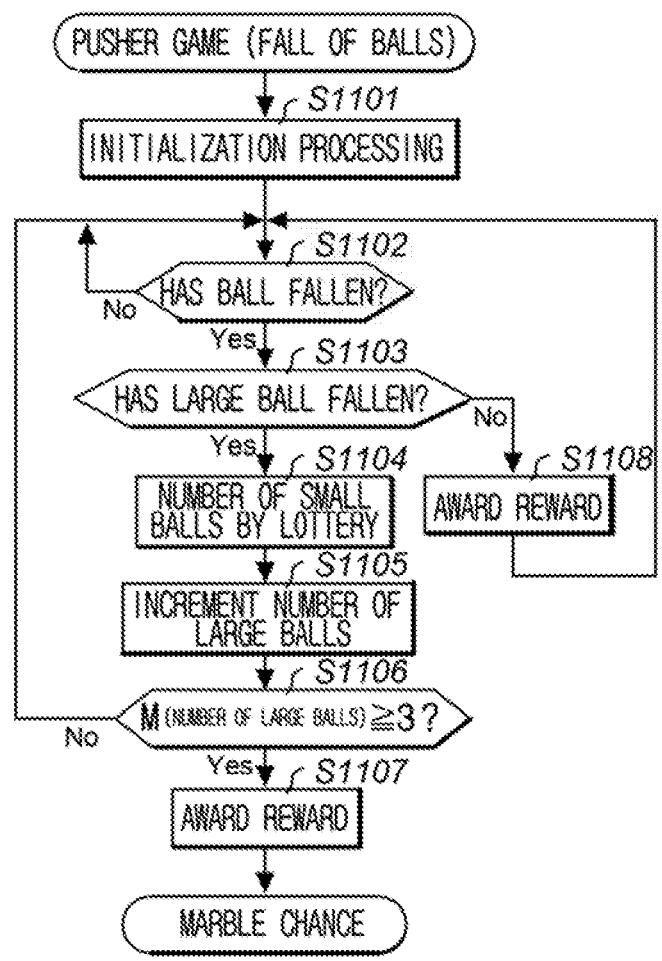
FIG. 19 is a flowchart illustrating processing in the pusher game.
Figure 20:
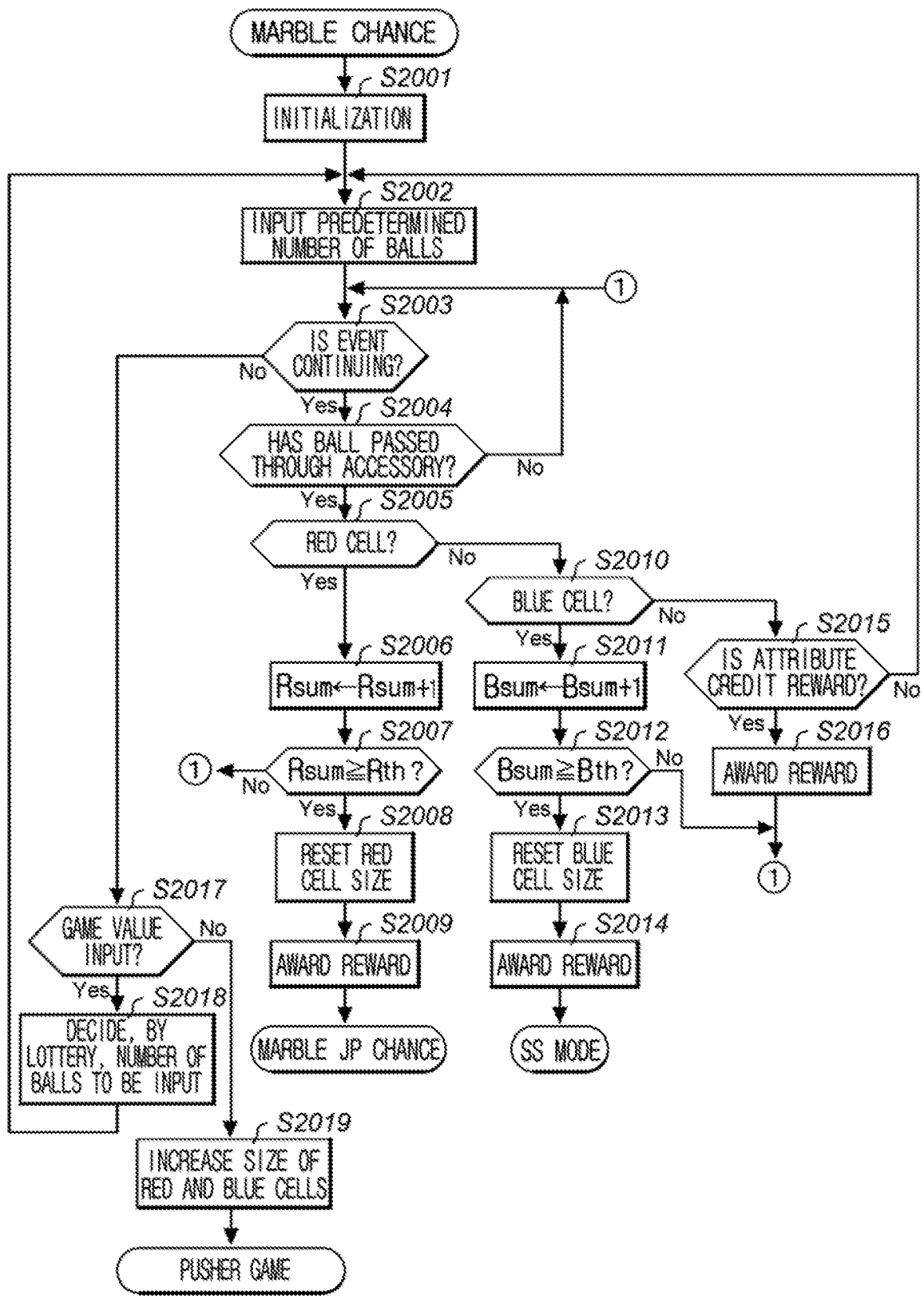
FIG. 20 is a flowchart illustrating processing in the marble chance.

FIG. 19 is a flowchart illustrating an example of the processing. First, when the game state transitions to the "pusher game" (see FIG. 4), the game controller 120 performs initialization processing (Step S1101). The initialization processing includes initialization (for example, zero reset) of a variable M indicating the cumulative number of large balls BM having fallen into the front area 61 after transition to the "pusher game", and initialization (for example, zero reset) of the total number of small balls SM to be fed when the game state transitions to the "marble chance".

Next, the game controller 120 determines whether a small ball SM or a large ball BM has fallen into the front area 61 (Step S1102). In practice, since the receiver 121 receives information output from the small ball sensor 165 and the large ball sensor 164, the game controller 120 determines whether a small ball SM or a large ball BM has fallen into the front area 61 based on the information. When the game controller 120 determines that no small ball SM or large ball BM has fallen into the front area 61 (NO in a determination result at Step S1102), the game controller 120 returns the procedure to Step S1102. This allows the procedure not to proceed until either a small ball SM or a large ball BM falls into the front area 61.

When the game controller 120 determines that a small ball SM or a large ball BM has fallen into the front area 61 (YES in the determination result at Step S1102), the game controller 120 determines whether the fallen ball is a large ball BM (Step S1103). When the game controller 120 determines that a large ball BM has fallen into the front area 61 (YES in a determination result at Step S1103), the game controller 120 decides the number of small balls SM by a lottery (Step S1104). The lottery for the number of small balls SM may be executed, for example, by the screen-front lottery portion 180 (see FIG. 11).

The total number of small balls SM to be fed to the first distributer 210 when the game state transitions to the "marble chance" is a cumulative number of small balls SM decided by lottery. In the present embodiment, the condition to transition to the "marble chance" is that, for example, three large balls BM fall into the front area 61. Every time a large ball BM falls into the front area 61, the number of small balls is decided by lottery. At a point in time when three large balls BM have fallen into the front area 61, small balls SM corresponding to the cumulative number of the number of small balls SM decided every time a large ball BM falls into the front area 61 until that point are fed to the first distributer 210 in the "marble chance". Furthermore, when one large ball BM falls into the front area 61, the number of small balls SM is decided by lottery, for example, in a range from "10" to "30". Therefore, the total number of small balls SM to be fed to the first distributer 210 in the "marble chance" is in a range from "30" to "90".

When a large ball BM falls into the front area 61, the game controller 120 increments the variable M (the number of large balls) by "1" (Step S1105). Next, the game controller 120 determines whether the incremented variable M is "3" or more (Step S1106). If the variable M is "3" or more (YES in a determination result at Step S1006), the transition condition to the "marble chance" is satisfied. Therefore, the game controller 120 awards a player a predetermined reward (Step S1107), adds the amount of credits of the player, for example, by "100", and causes the game state to transition to the "marble chance". If the variable M is not "3" or more (NO in the determination result at Step S1006), the game controller 120 returns the procedure to Step S1102.

Conversely, when the game controller 120 determines that a small ball SM or a large ball BM has fallen into the front area 61, and determines that the fallen ball is not a large ball BM (NO in the determination result at Step S1103), this means that the fallen ball is a small ball SM. Therefore, the game controller 120 awards a player a reward associated with a fall of a small ball SM into the front area 61 (Step S1108), increments the amount of credits of the player, for example, by "1", and returns the procedure to Step S1102.

According to such processing, the game state is maintained in the "pusher game" until three large balls BM fall into the front area 61. When three large balls BM have fallen into the front area 61, the game state transitions to the "marble chance".

Processing in "Marble Chance"

In the "marble chance", a predetermined number of small balls SM are entered onto the first distributer 210. Among these small balls SM, only a small ball SM that has passed through the hole 215 enters into the second distributer 220. Among these small balls SM, only a small ball SM that has passed through the hole 225 enters into the accessory 230. In the "marble chance", a cell positioned in a direction of twelve o'clock in the circle Gs is selected, from among the cells in the circle Gs rotationally displayed, at a timing when a small ball SM that entered onto the accessory 230 has passed through the pipe 232 and is detected by the sensor 234. Next, game processing will be performed when the game state transitions to the "marble chance".

First, when the game state transitions to the "marble chance" (see FIG. 4), the game controller 120 performs the initialization processing (Step S2001). The initialization processing includes initialization (for example, zero reset) of a variable Rsum indicating the number of selection of the red cell, and initialization (for example, zero reset) of a variable Bsum indicating the number of selection of the blue cell. In the previous "marble chance", if the game state has not transitioned to the "marble JP chance" or the "SS mode" (failed), the size of each cell of the circle Gs has a size set at the time of the end of the previous "marble chance". Conversely, in the previous "marble chance", if the game state has transitioned to the "marble JP chance" or the "SS mode" (success), the size of the corresponding cell has been reset to the initial size (see FIG. 21 and FIG. 22).

Next, the game controller 120 causes a predetermined number of small balls SM to be entered onto the first distributer 210 (Step S2002). Specifically, the operation instructor 125 instructs the route switcher 193 to select the conveyor device 195, instructs the route switcher 196 to select the area 200, and instructs the hopper 192 to discharge a predetermined number of small balls SM. This allows the predetermined number of small balls SM to be entered onto the first distributer 210 via the route switcher 193, the conveyor device 195, the route switcher 196, and the guide path 208 (see FIG. 13). Here, the predetermined number refers to the following. When the game state transitions from the "pusher game", the predetermined number has a value accumulating the number of small balls SM decided by a lottery every time a large ball BM falls in the "pusher game". When a game value is fed, as described later, the predetermined number is the number decided by lottery due to the input. When a normal cell having the attribute of "addition of lottery balls" is selected, the predetermined number has, for example, "10".

After feeding of small balls SM, the game controller 120 determines whether an event is continuing (Step S2003). The event refers to the following states. One is a state in which after the predetermined number of small balls SM have entered onto the first distributer 210 at Step S2002, all the small balls SM are collected via the hole 217 or 227, or the pipe 232. Another one is a state in which after the predetermined number of small balls SM is fed, a predetermined time (an estimated time until all the fed small balls SM are collected, for example, one minute) has passed. If the event is continuing (YES in a determination result at Step S2003), the game controller 120 determines whether small balls SM entered onto the accessory 230 has passed through the pipe 232 and are detected by the sensor 234 (Step S2004). If the small balls SM are not detected (NO in a determination result at Step S2004), the game controller 120 returns the procedure to Step S2003.

Conversely, if the small balls SM are detected (YES in the determination result at Step S2004), the game controller 120 determines whether a cell positioned in a direction of twelve o'clock in the circle Gs is a red cell at the detection timing (Step S2005).

At the detection timing, if a red cell is positioned in the direction of twelve o'clock in the circle Gs (YES in a determination result at Step S2005), this means that the red cell is selected by lottery, and thus the game controller 120 increments the variable Rsum by "1" (Step S2006).

Next, the game controller 120 determines whether the variable Rsum after the incrementing is equal to or greater than a threshold Rth (Step S2007). The threshold Rth is the number of selections of the red cell required for the transition from the "marble chance" to the "marble JP chance", and in the present example, the threshold Rth is set to "3" as described above. The threshold Rth can take a value other than "3".

If the variable Rsum is less than the threshold Rth (NO in a determination result at Step S2007), the game controller 120 returns the procedure to Step S2003. This allows continuous determination of whether small balls SM have been detected by the sensor 234 until the event ends.

Conversely, if the variable Rsum is equal to or greater than the threshold Rth (YES in the determination result at Step S2007), the game state transitions to the "marble JP chance". The game controller 120 resets the size of the red cell to the initial value before the transition (Step S2008), and awards a player a predetermined reward (Step S2009). The reward awarder 124 awards the player a predetermined reward based on a selection result of the red cell, being an example of the specific lottery element. Thereafter, the game controller 120 causes the game state to transition to the "marble JP chance".

The reason to reset the size of the red cell is as follows. If transition to the "marble JP chance" or the "SS mode" fails, as described below, processing to increase the size of the red cell or the blue cell may be performed. However, this time, transition to the "marble JP chance" has succeeded. Therefore, the size of the red cell is reset in order to return the probability of selecting the red cell at the time of executing the "marble chance" next time to an initial value (an example of a reference value). As the initial value of the size of the red cell, the red cell has a shape of a sector with the central angle being 30 degrees, as shown in FIG. 21 and FIG. 22. Furthermore, the reward at Step S2009 is, for example, addition of "10" to the number of games of the variable probability slot game or the like. In other words, the reward awarder 124 awards a player a right to execute a specific lottery as a reward. As is understood from the foregoing descriptions, the probability changer 123 sets the probability of selecting the red cell in the next event to the reference value (Step S2008), when the reward awarder 124 awards a player a predetermined reward (Step S2009).

In the above descriptions, the game state transitions to the "marble JP chance" when the variable Rsum becomes equal to or greater than the threshold Rth to simplify description. However, even if the variable Rsum becomes equal to or greater than the threshold Rth, the variable Rsum may be counted until the event ends, without the game state immediately transitioning to the "marble JP chance". The number of small balls SM to be fed in the next "marble JP chance" is decided by a lottery according to the variable Rsum.

Conversely, at the detection timing of the small balls SM by the sensor 234, if a cell positioned in the direction of twelve o'clock in the circle Gs is not a red cell (NO in the determination result at Step S2005), the game controller 120 determines whether the cell positioned in the direction of twelve o'clock is a blue cell (Step S2010). If the cell positioned in the direction of twelve o'clock is a blue cell (YES in a determination result at Step S2010), this means that the blue cell is selected by a lottery, and thus the game controller 120 increments the variable Bsum by "1" (Step S2011).

Next, the game controller 120 determines whether the variable Bsum after the incrementing is equal to or greater than a threshold Bth (Step S2012). The threshold Bth is the number of selections of the blue cell required for transition from the "marble chance" to the "SS mode", and in the present example, the threshold Bth is set to "3" as described above. The threshold Bth may take a value other than "3". If the variable Bsum is less than the threshold Bth (NO in a determination result at Step S2012), the game controller 120 returns the procedure to Step S2003.

Conversely, if the variable Bsum is equal to or greater than the threshold Bth (YES in the determination result at Step S2012), the game state transitions to the "SS mode". The game controller 120 resets the size of the blue cell to the initial value before the transition (Step S2013), and awards a player a predetermined reward (Step S2014). In other words, the reward awarder 124 awards the player the predetermined reward based on a selection result of the blue cell, which is an example of a specific lottery element. The reward contents are freely selectable. For example, the reward awarder 124 awards the player a right to execute a specific lottery as a reward. Thereafter, the game controller 120 causes the game state to transition to the "SS mode".

The reason to reset the size of the blue cell is substantially the same as the reason to reset the size of the red cell. That is, if transition to the "marble JP chance" or the "SS mode" fails, as described below, processing of enlarging the size of the red cell or the blue cell may be performed. However, this time, transition to the "SS mode" has succeeded. Therefore, the size of the blue cell is reset in order to return the probability of selecting the blue cell at the time of executing the "marble chance" next time to an initial value (an example of the reference value). As the initial value of the size of the blue cell, the blue cell has a shape of a sector with the central angle being 30 degrees, as shown in FIG. 21 and FIG. 22. As is understood from the foregoing descriptions, the probability changer 123 sets the probability of selecting the blue cell in the next event to the reference value (Step S2013), when the reward awarder 124 awards a player a predetermined reward (Step S2014).

In the above descriptions, the game state transitions to the "SS mode" when the variable Bsum is equal to or greater than the threshold Bth to simplify description. However, even if the variable Bsum is equal to or greater than the threshold Bth, the variable Bsum may be counted until the event ends, without the game state immediately transiting to the "SS mode". The initial number of executions of the variable probability slot game to be set in the next "SS mode" is decided by lottery according to the variable Bsum. If the game apparatus 10 is configured such that the variables Rsum and Bsum are counted until the event ends, there may be a case in which the variable Rsum is equal to or greater than the threshold Rth and the variable Bsum is equal to or greater than the threshold Bth once the event ends. In this case, the game state may transition to a game state in which the variable first is equal to or greater than the threshold, or transition to the "marble JP chance" may be prioritized.

If a cell positioned in the direction of twelve o'clock in the circle Gs is neither a red cell nor a blue cell at the timing at which a small ball SM has passed the sensor 234 (NO in a determination result at Step S2010), this means that any one of the normal cells (1) to (6) has been selected by lottery. Therefore, the game controller 120 first determines whether the attribute of the selected normal cell is "credit reward" (Step S2015). If the attribute of the selected normal cell is "credit reward" (YES in a determination result at Step S2015), the game controller 120 adds a predetermined value (for example, "10") to the number of credits of a player as a reward (Step S2016). Thereafter, the game controller 120 returns the procedure to Step S2003. Conversely, if the attribute of the selected normal cell is not "credit reward" (NO in the determination result at Step S2015), this means that the attribute of the selected normal cell is "addition of lottery balls". Therefore, the game controller 120 returns the procedure to Step S2002. This allows "10" small balls SM to be additionally entered onto the first distributer 210 at Step S2002.

When the game controller 120 determines that the event is not continuing at Step S2003, the game controller 120 prompts a player to input a game value, for example, using a display on the display device 15 and/or audio guidance. When a predetermined amount of game value is input by a player within a predetermined time (YES in a determination result at Step S2017), the game controller 120 decides the number of small balls SM by a lottery (Step S2018) and returns the procedure to Step S2002. This allows the small balls SM in the number decided by the lottery to be fed to the first distributer 210, to restart the event (the event is substantially extended). In other words, the game controller 120 (the lottery display controller 122) adds the number of executions of the lottery in the event, upon receipt of an input of a game value from a player. It is to be noted that when the event is extended by input of a game value, the game controller 120 may increase the size of the red cell and/or the blue cell. Extension of the event by the insertion of a game value may be performed, for example, only on condition of being performed three times.

Conversely, if a game value is not input by a player within a predetermined time (NO in the determination result at Step S2017), the game controller 120 increases the size of the red cell according to the variable Rsum and the size of the blue cell according to the variable Bsum (Step S2019), and causes the game state to transition to the "pusher game".

Since the variable Rsum is less than "3" at Step S2019, the variable Rsum is any of "0", "1", or "2". If the variable Rsum is "0", the game controller 120 does not change, for example, the central angle of the red cell. If the variable Rsum is "1", the game controller 120 increases the central angle of the red cell by 10 degrees. If the variable Rsum is "2", the game controller 120 increases the central angle of the red cell by 20 degrees. Similarly, since the variable Bsum is less than "3" at Step S2020, the variable Bsum is any of "0", "1", or "2". If the variable Bsum is "0", the game controller 120 does not change, for example, the central angle of the blue cell. If the variable Bsum is "1", the game controller 120 increases the central angle of the blue cell by 10 degrees. If the variable Bsum is "2", the game controller 120 increases the central angle of the blue cell by 20 degrees.

For example, such a case is assumed in which an initial value is set in the cell management table 133 as shown in FIG. 22 in the "marble chance", and the circle Gs is displayed as shown in FIG. 21. In this state, when the "marble chance" ends in a state in which the red cell is selected twice and the blue cell is selected once, the cell management table 133 is updated as described below.

Figures 23, 24:
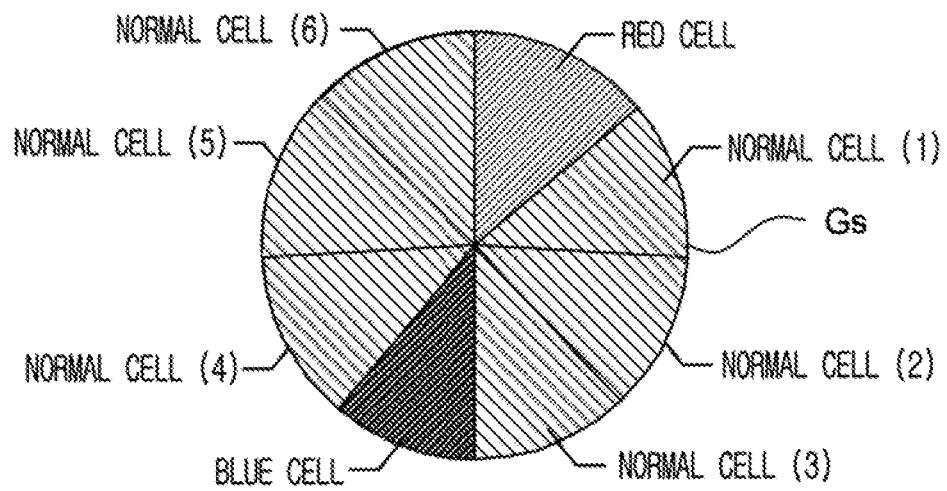
FIG. 23 is a diagram illustrating an example of a screen at the time of the marble chance.
FIG. 24 is a diagram illustrating an example of contents in the cell management table.

In other words, as shown in FIG. 24, in the cell management table 133, the central angle of the red cell is increased by 20 degrees because the red cell has been selected twice and changed to 50 degrees. In addition, the central angle of the blue cell is increased by 10 degrees because the blue cell has been selected once and changed to 40 degrees. In the example of the cell management table 133 in FIG. 24, the central angle of each of the normal cells (1) to (3) is reduced by 6.7 (=20/3) degrees due to the enlargement of the central angle of the red cell by 20 degrees. Furthermore, the central angle of each of the normal cells (4) to (6) is reduced by 3.3 (=10/3) degrees due to the increase of the central angle of the blue cell by 10 degrees. It is to be noted that the attributes of the normal cells (1) to (6) are maintained in the state shown in FIG. 22.

FIG. 23 is a diagram illustrating the circle Gs displayed when the cell management table 133 has the contents shown in FIG. 24. As shown in FIG. 23, while the central angle each of of the red cell and the blue cell is increased as compared with the example shown in FIG. 1, the central angle of each of the normal cells (1) to (6) is decreased.

Therefore, when the game state returns to the "pusher game" and transitions again to the "marble chance", the probability of selecting the red cell by a lottery increases according to the number of times that the red cell is selected by lottery in the previous "marble chance". Similarly, when the game state returns to the "pusher game" and transitions again to the "marble chance", the probability of selecting the blue cell by lottery increases according to the number of times that the blue cell is selected by the lottery in the previous "marble chance". This enables to provide a player a motivation to continue the game in the station unit ST. As is understood from the foregoing descriptions, the probability changer 123 changes the probability of selecting the red cell or the blue cell in the next event, based on a selection result of the red cell or the blue cell (the variable Rsum or the variable Bsum) in one event (Step S2019). Specifically, when a reward is not awarded to a player at Step S2009 or S2014, the probability changer 123 increases the probability of selecting the red cell or the blue cell in the next event. Furthermore, a lottery combining a rotational display of the circle Gs and a fall of a small ball SM, that is, a lottery using both the image display and the movement of a small ball SM, which is a tangible object, can reduce the probability of imparting an impression of manipulation to a player, as described above. Since the circle Gs displayed on the screen 150 is realized by software processing as described above, the probability of selecting each of the cells by lottery is easily changed.

Modification

The embodiment described above may be variously modified as described below, for example. As for the modified aspects described below, one or more freely selected aspects may be combined with one another within a range that does not cause conflict.

First Modification

The symbols in the normal slot game and the variable probability slot game in the embodiment described above are merely examples. Each of the symbols may be something other than numerals, and for example, may be a symbol of a cherry, orange, or BAR. The symbols in the slot game may not be an independent single spherical body, and they may be arranged on a reel (a drum).

Second Modification

In the embodiment described above, the probability of selecting a cell is increased by increasing the central angle of the red cell or the blue cell. However, a method of changing the probability of selecting a cell is not limited to the example described above. For example, the number of red cells or the blue cells may be changed in order to change the probability of being selected. Alternatively, a change of the central angle and a change of the number of cells may be combined in order to change the probability of being selected. It is not always necessary to select a lottery element with a probability proportional to the size or the number of cells. A lottery element may be selected with a probability substantially proportional to the size or the number of cells. Alternatively, a lottery element may be selected with a probability that changes stepwise (or discretely) according to the size or the number of cells. In other words, it is sufficient for the lottery probability to change in some form, according to change in the size or the number of a specific area, such as the red cell or the blue cell. Specifically, it is sufficient for the lottery probability to change according to (a) the ratio of an area of a specific area to the total area of all cells, or (b) the ratio of the number of specific areas to the total number of cells.

Third Modification

In the embodiment described above, a reward is awarded when the number of times of selecting the specific lottery element is equal to or greater than a predetermined threshold. Conversely, when the number of times is less than the predetermined threshold, the probability of selecting the specific lottery element in the next event is increased based on the number of times of selecting the specific lottery element. However, the condition of awarding a reward is not limited thereto. For example, a reward may be awarded when the number of times of selecting the specific lottery element is less than a predetermined threshold (including a case in which the specific lottery element is not selected). Conversely, when the number of times is equal to or greater than the predetermined threshold, the probability of selecting the specific lottery element in the next event may be decreased based on the number of times of selecting the specific lottery element.

Fourth Modification

In the embodiment described above, the probability of selecting a specific lottery element is changed at a timing after all the lotteries are completed in an event. However, the timing at which the probability of selecting a specific lottery element is changed is not limited to the example described above. For example, the probability of selecting a specific lottery element may be changed at a timing in the middle of the event based on a result of lottery executed by the timing. Alternatively, the probability of selecting a specific lottery element may be changed at a timing immediately before starting the next event, based on a lottery result in the previous event.

Fifth Modification

The following (a) or (b) may be applied to the embodiment described above. (a) When a combination of a plurality of kinds of specific lottery elements is established, a reward may be awarded. Conversely, when the combination thereof is not established, the probability of establishing the combination in the next event may be increased. (b) When the combination thereof is not established, a reward may be awarded. Conversely, when the combination thereof is established, the probability of establishing the combination in the next event may be decreased. Here, the number of kinds of specific elements constituting the combination is not limited to an example in which the number is one. For example, such a combination may be used so that the number of one specific element is two or more, and the number of another specific element is five or more.

Sixth Modification

In the embodiment described above, an area of a specific lottery element (the red cell or the blue cell) in the plurality of lottery elements (the circle Gs) is changed in order to change the probability of selecting the specific lottery element (the red cell or the blue cell) in the next event. However, the method of changing the probability is not limited thereto. For example, the number of selecting a lottery element from the lottery elements by a lottery in the next event may be changed based on the number of selections of the specific lottery element. For example, the number of selections of a lottery element by a lottery in the next event is added based on the number of selections of the specific lottery element.

Seventh Modification

In the embodiment described above, in a lottery using screen display at least in a part thereof, a reward is awarded based on a selection result of a specific lottery element. The probability of selecting the specific lottery element in the next event is changed based on the selection result of the specific lottery element. However, a case of awarding a reward is not limited thereto. For example, a case is assumed in which the lottery is executed by feeding a predetermined number of spherical bodies to a physical lottery board surface having lottery holes. In addition, it is assumed that these spherical bodies are fed at the same time or one by one in a certain event. In this case, a reward may be awarded when one or more spherical bodies is fed into a specific lottery hole from among these lottery holes, that is, the specific lottery hole is selected for a predetermined number of times or more (including a case in which the specific lottery hole is selected once). Conversely, if the specific lottery hole is not selected for the predetermined number of times or more, the number of spherical bodies to be fed to the physical lottery board surface in the next event may be increased or may be decreased. Alternatively, when a specific lottery hole is not selected for the predetermined number of times or more, in the next event, at least some of lottery holes other than the specific lottery hole may be closed so that the spherical body does not enter the holes.
Eighth Modification The contents of the game provided by the game apparatus 10 may be realized by a program. In this case, it is desired that the program be recorded in a computer-readable recording medium to provide the recording medium. The same program may be executed by an information terminal including a processor, a memory device, and a display device (a display), to provide the subject game by displaying progression of the game on the display device. A recording medium that stores the program therein is, for example, non-transitory, and may include a known freely selected recording medium, such as a semiconductor recording medium or a magnetic recording medium, other than an optical recording medium, such as an optical disk. It is sufficient for the program to cause a computer including the processor 12 to function as each portion of the game apparatus 10. A recording medium, on which this program is stored, may be stored in the game apparatus 10. Alternatively, the recording medium may be stored in a distribution server that distributes the program and may be accessed by the game apparatus 10. In this case, a format type of the program code of the recording medium provided in the distribution server may differ from that of the game apparatus 10. That is, so long as the game apparatus 10 can execute the program that is downloaded from the distribution server, the format type is not particularly limited thereto. The program may be divided into a plurality of programs, and after each program is downloaded at a different timing, these programs may be integrated by the game apparatus 10. Each of the divided programs may be distributed by a different distribution server.

APPENDIX

For example, the following configurations are understood based on the foregoing descriptions. In the following descriptions, reference signs in the drawings are denoted in parentheses as appropriate, in order to facilitate understanding of each aspect, but the present invention is not limited to these aspects illustrated in the drawings.

Appendix 1

A game apparatus according to a first aspect includes: at least one processor (12); and a memory (13) that is coupled to the at least one processor and configured to store therein instructions executed by the at least one processor, in which, based on the instructions, the at least one processor is configured to: select, by lottery, at least one lottery element from among lottery elements including a specific lottery element, in an event; award a player a reward when the specific lottery element is selected; and change, based on a result of the lottery in the event, a probability of selecting the specific lottery element in a next event.

In the game apparatus according to the first aspect, based on the result of the lottery in the event, the probability of selecting the specific lottery element by lottery in the next event is changed. This increases the user's expectation such that the specific lottery element will be selected by lottery in the next event, thereby enabling provision of motivation to continue the game.

Here, "execute a lottery" (active) refers to an operation to select a lottery element mainly by a lottery portion, and "being selected by a lottery" (passive) is used to indicate a lottery element selected by the lottery portion. The lottery element refers to an element having a possibility of being selected in a lottery (a possibility of being drawn), and the specific lottery element refers to a specific lottery element associated with a reward, of the lottery elements. The "selection result of a specific lottery element" may be such that the number of selections of a specific lottery element being selected by a lottery is equal to or greater than a threshold in an event, for example, as shown in the embodiment. Alternatively, a specific lottery element is selected in a specific time zone in the event. Awarding a predetermined reward based on the selection result of a specific lottery element refers to awarding a predetermined reward when, for example, the number of selections of the specific lottery element becomes equal to or greater than the threshold in a predetermined event. The lottery portion may perform the operation to select a specific lottery element from lottery elements by executing software, such as screen display or by a physical mechanism. For example, as in the embodiment described above, the lottery portion assigns each lottery element to areas (cells) in a circle that is radially divided, and rotates the circle on a screen on which a preset lottery element is displayed as a specific lottery element in a part of the areas. At this time, at a timing at which a small ball fed from outside of the circle toward the inside passes through a peripheral edge of the circle, the lottery portion may determine that a lottery element corresponding to an area overlapped with the small ball is selected. Instead of the small ball, which is a tangible object, a virtual small ball displayed as an image may be used to execute a lottery. The lottery portion may execute a lottery by a tangible mechanism, for example, a roulette, without displaying a circle on the screen. For example, each of the lottery elements may be designated as figures from "1" to "9". Among these figures, for example, "3", "5", and "7" may be designated as the specific lottery elements. In this case, lottery probabilities of these figures may be set evenly or unevenly to select one or two or more figures (lottery elements). An event indicates a period that is a breakpoint in a certain game, or a state of being a special game. Specifically, the event indicates a state in which an event is specially executed with respect to a normal game and is being a jackpot or a chance game by which many rewards can be acquired. The jackpot or the chance game may be not only of one kind but may also be of several kinds. The reward may be, for example, a game value, a right to join a lottery having a higher probability of acquiring more rewards, or award of the number of executions of games, such as the slot game.

Appendix 2

In the game apparatus of a second aspect according to the first aspect, a single lottery area is divided into unit areas, each of the lottery elements is assigned to at least one unit area of the unit areas, and the at least one processor is configured to: select one lottery element from among the lottery elements with a probability according to a size of each of the unit areas and/or number of the unit areas; and change a probability of selecting the specific lottery element by changing the size of a unit area, of the unit areas, and/or number of unit areas corresponding to the specific lottery element.

In the game apparatus according to the second aspect, since a game object (for example, a small ball) falls into (or overlaps on) a specific area in the circle, the specific lottery element assigned to the specific area is selected. The circle may be displayed on a screen or may be a physical mechanism, such as a roulette wheel.

Appendix 3

In the game apparatus of a third aspect according to the first aspect or the second aspect, in a case in which the reward is not awarded to the player in the event, the at least one processor is configured to increase a probability of selecting the specific lottery element in the next event, based on number of times that the specific lottery element has been selected in the event.

In the game apparatus according to the third aspect, when a reward is not awarded to the player in the event, the probability of selecting the specific lottery element in the next event increases, thereby increasing the possibility that a reward is awarded to the player. This enables further motivating the player to continue the game.

Appendix 4

In the game apparatus of a fourth aspect according to any one of the first aspect to the third aspect, in a case in which the reward is awarded to the player in the event, the at least one processor is configured to set a probability of selecting the specific lottery element in the next event to a reference value.

In the game apparatus according to the fourth aspect, when the reward is awarded to the player in the event, the probability of selecting the specific lottery element in the next event is initialized to a reference value, thereby suppressing an excessive increase of the probability.

Appendix 5

The game apparatus of a fifth aspect according to any one of the first aspect to the fourth aspect further includes a lottery apparatus configured to execute a first-stage lottery, in which, in a case in which a lottery result in the first-stage lottery satisfies a predetermined condition, the at least one processor is configured to select at least one lottery element from among the lottery elements, as a second-stage lottery.

In the game apparatus according to the fifth aspect, a sense of tension and a sense of expectation may be provided to a player by lotteries in plural stages. The first-stage lottery may be executed by a physical mechanism that causes the game state to transition to the second-stage lottery under conditions in which a ball enters into a specific hole of the holes, such as the first distributer described in the above embodiment, or by software such as for a screen display.

Appendix 6

In the game apparatus of a sixth aspect according to any one of the first aspect to the fifth aspect, the at least one processor is configured to the increase number of executions of a lottery in the event, upon receipt of input of a specific game value from the player.

In the game apparatus according to the sixth aspect, even if there is a possibility that a reward is not awarded in the event, since the number of executions of a lottery increases by the input of a game value, the possibility of selecting a specific lottery element is increased. This enables reducing the probability that the player will discontinue the game in the middle of the game.

Appendix 7

In the game apparatus of a seventh aspect according to any one of the first aspect to the sixth aspect, the reward is a right for the player to execute a specific lottery.

In the game apparatus according to the seventh aspect, since the right to execute a specific lottery is awarded to the player as a reward, motivation to continue the game is given to the player.

Appendix 8

The game apparatus of an eighth aspect according to any one of the first aspect to the seventh aspect further includes a display (15), in which the at least one processor is further connected to the display, and the at least one processor is configured to cause the display to display how a probability of selecting the specific lottery element changes.

In the game apparatus according to the eighth aspect, as in the game apparatus of the first aspect, motivation to continue the game is given to the player.

Appendix 9

A non-transitory computer-readable recording medium having recorded thereon a computer program for a game apparatus having at least one processor (12), the computer program causing the at least one processor to: select, by lottery, at least one lottery element from among lottery elements including a specific lottery element, in an event; award a player a reward when the specific lottery element is selected; and change, based on a result of the lottery in the event, a probability of selecting the specific lottery element in a next event.

In the recording medium according to another aspect, as in the game apparatus of the first aspect, a motivation to continue the game is given to a player.

Appendix 10

The game apparatus according to a tenth aspect includes a lottery portion configured to select, by lottery, at least one lottery element from among lottery elements including a specific lottery element in an event; a reward awarder configured to award a player a reward, when the lottery portion selects the specific lottery element; and a probability changer configured to change, based on a result of the lottery in the event, a probability of selecting the specific lottery element in a next event.

In the game apparatus according to the tenth aspect, as in the game apparatus of the first aspect, motivation to continue the game is given to the player.

DESCRIPTION OF REFERENCE SIGNS

10 . . . game apparatus, 12 . . . processor, 13 . . . memory device, 14 . . . detection device, 15 . . . display device, 120 . . . game controller, 122 . . . lottery display controller, 123 . . . probability changer, 124 . . . reward awarder.

What is claimed is:

1. A game apparatus comprising:
   a display;
   at least one processor; and
   a memory that is coupled to the at least one processor and configured to store therein instructions executed by the at least one processor,
   wherein based on the instructions, the at least one processor is configured to:
     select, by lottery executed using both a change of a virtual symbol displayed on the display and a physical ball, at least one lottery element from among lottery elements including a specific lottery element, in a second game that is transitioned to from a first game;
     award a player a reward when the specific lottery element is selected; and
     change, based on a result of the lottery in the second game, a probability of selecting the specific lottery element in a next second game after the second game that is transitioned to from the first game is completed.

2. The game apparatus according to claim 1, wherein:
   a single lottery area is divided into unit areas,
   each of the lottery elements is assigned to at least one unit area of the unit areas, and
   the at least one processor is configured to:
     select one lottery element from among the lottery elements with a probability according to a size of each of the unit areas and/or number of the unit areas; and
     change a probability of selecting the specific lottery element by changing the size of a unit area, of the unit areas, and/or number of unit areas corresponding to the specific lottery element.

3. The game apparatus according to claim 1, wherein in a case in which the reward is not awarded to the player in the second game, the at least one processor is configured to increase a probability of selecting the specific lottery element in the next second game, based on number of times that the specific lottery element has been selected in the second game.

4. The game apparatus according to claim 1, wherein in a case in which the reward is awarded to the player in the second game, the at least one processor is configured to set a probability of selecting the specific lottery element in the next second game to a reference value.

5. The game apparatus according to claim 1, further comprising a lottery apparatus configured to execute a first-stage lottery,
   wherein in a case in which a lottery result in the first-stage lottery satisfies a predetermined condition, the at least one processor is configured to select at least one lottery element from among the lottery elements, as a second-stage lottery.

6. The game apparatus according to claim 1, wherein the at least one processor is configured to increase number of executions of a lottery in the second game, upon receipt of an input of a specific game value from the player.

7. The game apparatus according to claim 1, wherein the reward is a right for the player to execute a specific lottery.

8. The game apparatus according to claim 1, wherein:
   the at least one processor is further connected to the display, and
   the at least one processor is configured to cause the display to display how a probability of selecting the specific lottery element changes.

9. The game apparatus according to claim 1, further comprising:
   a guide path provided in front of the display and including a cutout,
   wherein, during the second game, the guide path receives the physical ball and the at least one lottery element is selected based on a state of the virtual symbol displayed on the display at a timing at which the physical ball falls from the cutout.

10. The game apparatus according to claim 1, further comprising:
    a pipe positioned behind the display; and
    a sensor,
    wherein, during the second game, the pipe receives the physical ball and the at least one lottery element is selected based on a state of the virtual symbol displayed on the display at a timing at which the physical ball is detected in the pipe by the sensor.

11. The game apparatus according to claim 1, wherein the virtual symbol comprises a circle, and the circle includes a plurality of cells as the lottery elements, and the cells include normal cells and specific lottery cells which are displayed differently from the normal cells.

12. The game apparatus according to claim 11, wherein the probability of selecting the specific lottery element in the next second game is changed by increasing a size of the specific lottery cells or a number of the specific lottery cells.

13. The game apparatus according to claim 11, wherein the circle is sectioned radially into a red cell, a normal cell, a normal cell, a normal cell, a blue cell, a normal cell, a normal cell, and a normal cell, and the red cell and the blue cell correspond to the specific lottery element.

14. The game apparatus according to claim 13, wherein the probability of selecting the specific lottery element in the next second game is changed by increasing a size of the specific lottery cells.

15. A non-transitory computer-readable recording medium having recorded thereon a computer program for a game apparatus having at least one processor, the computer program causing the at least one processor to:
    select, by lottery executed using both a change of a virtual symbol displayed on a display and a physical ball, at least one lottery element from among lottery elements including a specific lottery element, in a second game that is transitioned to from a first game;
    award a player a reward when the specific lottery element is selected; and
    change, based on a result of the lottery in the second game, a probability of selecting the specific lottery element in a next second game after the second game that is transitioned to from the first game is completed.

16. A game apparatus comprising:
    a display,
    a lottery portion configured to select, by lottery executed using both a change of a virtual symbol displayed on the display and a physical ball, at least one lottery element from among lottery elements including a specific lottery element in a second game that is transitioned to from a first game;
    a reward awarder configured to award a player a reward, when the lottery portion selects the specific lottery element; and a probability changer configured to change, based on a result of the lottery in the second game, a probability of selecting the specific lottery element in a next second game after the second game that is transitioned to from the first game is completed.

\* \* \* \* \*